(12) United States Patent
Orr et al.

(10) Patent No.: US 7,576,679 B1
(45) Date of Patent: Aug. 18, 2009

(54) RADAR DETECTOR WITH POSITION AND VELOCITY SENSITIVE FUNCTIONS

(75) Inventors: Steven K. Orr, Cincinnati, OH (US); Robert Gregory Blair, Cincinnati, OH (US); John Kuhn, Sharonville, OH (US); Timothy A. Coomer, West Chester, OH (US)

(73) Assignee: Escort Inc., West Chester, OH (US)

( * ) Notice: Subject to any disclaimer, the term of this patent is extended or adjusted under 35 U.S.C. 154(b) by 0 days.

(21) Appl. No.: 11/620,443

(22) Filed: Jan. 5, 2007

(51) Int. Cl.
*G01S 7/40* (2006.01)
*H04B 17/00* (2006.01)
*G01S 13/00* (2006.01)

(52) U.S. Cl. ............... 342/20; 342/13; 342/89; 342/104; 342/105; 342/115; 342/175; 342/195; 342/357.01; 342/357.06; 701/200; 701/207; 701/213

(58) Field of Classification Search ............ 342/13, 342/20, 89–93, 165, 173–175, 189–197, 342/357.01–357.17, 103, 104–116; 455/226.1; 340/425.5, 438, 439, 441, 557, 902, 903, 340/936, 988; 700/90; 701/97, 110, 119, 701/213–216, 200, 207; 324/175; 250/214 R, 250/214 B See application file for complete search history.

(56) References Cited

U.S. PATENT DOCUMENTS

| | | | | |
|---|---|---|---|---|
| 4,492,952 A | * | 1/1985 | Miller | 340/439 |
| 4,539,642 A | * | 9/1985 | Mizuno et al. | 701/97 |
| 4,581,769 A | * | 4/1986 | Grimsley et al. | 455/226.1 |
| 4,631,542 A | * | 12/1986 | Grimsley | 342/20 |
| 4,876,527 A | * | 10/1989 | Oka et al. | 340/441 |
| 4,954,828 A | * | 9/1990 | Orr | 342/20 |
| 4,986,385 A | * | 1/1991 | Masaki | 701/97 |
| 5,038,102 A | * | 8/1991 | Glasheen | 324/175 |
| 5,049,885 A | * | 9/1991 | Orr | 342/20 |
| 5,058,698 A | * | 10/1991 | Yoshida et al. | 701/110 |
| 5,079,553 A | * | 1/1992 | Orr | 342/20 |
| 5,127,487 A | * | 7/1992 | Yamamoto et al. | 701/97 |

(Continued)

FOREIGN PATENT DOCUMENTS

| JP | 09-027096 A1 * | 1/1997 |
|---|---|---|
| WO | WO97/08839 A2 * | 3/1997 |

OTHER PUBLICATIONS

"UNIDEN GPSRD Owner's Manual"; no date listed; no author listed.*
"UNIDEN Setting Industry Standard with GPS RD"; no author listed; dated Jan. 8, but no year is listed (2002?).*

*Primary Examiner*—Bernarr E Gregory
(74) *Attorney, Agent, or Firm*—Wood, Herron & Evans LLP

(57) ABSTRACT

A GPS enabled radar detector dynamically handles radar sources based upon previously stored geographically referenced information on such sources and data from the GPS receiver. The detector includes technology for determining the location of the detector, and comparing this location to the locations of known stationary sources, to improve the handling of such detections. The detector may ignore detections received in an area known to contain a stationary source, or may only ignore specific frequencies or may handle frequencies differently based upon historic trends of spurious police radar signals at each frequency. Notification of the driver will take on a variety of forms depending on the stored information, current operating modes, and vehicle speed.

43 Claims, 11 Drawing Sheets

U.S. PATENT DOCUMENTS

| | | | | |
|---|---|---|---|---|
| 5,134,406 A | * | 7/1992 | Orr | 342/20 |
| 5,153,512 A | * | 10/1992 | Glasheen | 324/175 |
| 5,164,729 A | * | 11/1992 | Decker et al. | 342/20 |
| 5,177,685 A | * | 1/1993 | Davis et al. | 340/988 |
| 5,206,500 A | * | 4/1993 | Decker et al. | 340/557 |
| 5,250,951 A | * | 10/1993 | Valentine et al. | 342/20 |
| 5,300,932 A | * | 4/1994 | Valentine et al. | 342/20 |
| 5,305,007 A | * | 4/1994 | Orr et al. | 342/20 |
| 5,347,120 A | * | 9/1994 | Decker et al. | 250/214 B |
| 5,365,055 A | * | 11/1994 | Decker et al. | 250/214 R |
| 5,400,034 A | * | 3/1995 | Smith | 342/103 |
| 5,450,329 A | * | 9/1995 | Tanner | 701/213 |
| 5,504,482 A | * | 4/1996 | Schreder | 340/988 |
| 5,515,042 A | * | 5/1996 | Nelson | 701/119 |
| 5,539,645 A | * | 7/1996 | Mandhyan et al. | 701/119 |
| 5,559,508 A | * | 9/1996 | Orr et al. | 340/902 |
| 5,668,554 A | * | 9/1997 | Orr et al. | 342/20 |
| 5,815,092 A | * | 9/1998 | Gregg et al. | 340/936 |
| 5,864,481 A | * | 1/1999 | Gross et al. | 700/90 |
| 5,929,753 A | * | 7/1999 | Montague | 340/425.5 |
| 5,955,973 A | * | 9/1999 | Anderson | 340/988 |
| 5,977,884 A | * | 11/1999 | Ross | 340/936 |
| 5,983,161 A | * | 11/1999 | Lemelson et al. | 340/903 |
| 6,084,510 A | * | 7/2000 | Lemelson et al. | 342/357.06 |
| 6,118,403 A | * | 9/2000 | Lang | 342/357.09 |
| 6,201,493 B1 | * | 3/2001 | Silverman | 342/20 |
| 6,204,798 B1 | * | 3/2001 | Fleming, III | 342/20 |
| 6,252,544 B1 | * | 6/2001 | Hoffberg | 342/357.1 |
| 6,384,776 B1 | * | 5/2002 | Martin | 342/357.09 |
| 6,400,304 B1 | * | 6/2002 | Chubbs, III | 342/20 |
| 6,614,385 B2 | * | 9/2003 | Kuhn et al. | 340/438 |
| 6,670,905 B1 | | 12/2003 | Orr | |
| RE39,038 E | | 3/2006 | Fleming, III | |
| RE40,653 E | | 3/2009 | Fleming, III | |

* cited by examiner

Fig. 7A

|  | GPS "Slow Speed Cancellation" | Signal Filter | City Gain |
|---|---|---|---|
| HWY |  |  |  |
| AUTO | X | X |  |
| City | X |  | X |

RADAR DETECTOR WITH POSITION AND VELOCITY SENSITIVE FUNCTIONS

CROSS-REFERENCE TO RELATED APPLICATIONS

This application is related to U.S. Ser. No. 10/396,881, filed Mar. 25, 2004, which is a United States divisional application of U.S. Ser. No. 09/889,656, filed Jul. 19, 2001 (with the declaration under Section 371(c)(4) filed Mar. 15, 2002), now U.S. Pat. No. 6,670,905, which is a U.S. National Phase of PCT/US00/16410 filed Jun. 14, 2000, which is a continuation-in-part of both U.S. Provisional Patent Application Ser. No. 60/139,097, filed Jun. 14, 1999, and U.S. Provisional Patent Application Ser. No. 60/145,394, filed Jul. 23, 1999, all of which are hereby incorporated herein in their entirety.

FIELD OF THE INVENTION

The present invention relates to radar detectors.

BACKGROUND OF THE INVENTION

Radar detectors warn drivers of the use of police radar, and the potential for traffic citations if the driver exceeds the speed limit. The FCC has allocated several regions of the electromagnetic spectrum for police radar use. The bands used by police radar are generally known as the X, K and Ka bands. Each relates to a different part of the spectrum. The X and K bands are relatively narrow frequency ranges, whereas the Ka band is a relatively wide range of frequencies. By the early 1990's, police radar evolved to the point that it could operate almost anywhere in the 1600-megahertz wide Ka band. During that time radar detectors kept pace with models that included descriptive names like "Ultra Wide" and "Super Wide." More recently, police have begun to use laser (optical) systems for detecting speed. This technology was termed LIDAR for "Light Detection and Ranging."

Radar detectors typically comprise a microwave receiver and detection circuitry that is typically realized with a microprocessor or digital signal processor (DSP). Microwave receivers are generally capable of detecting microwave components in the X, K, and very broad Ka band. In various solutions, either a microprocessor or DSP is used to make decisions about the signal content from the microwave receiver. Systems including a digital signal processor have been shown to provide superior performance over solutions based on conventional microprocessors due to the DSP=s ability to find and distinguish signals that are buried in noise. Various methods of applying DSP=s were disclosed in U.S. Pat. Nos. 4,954,828, 5,079,553, 5,049,885, and 5,134,406, each of which is hereby incorporated by reference herein.

Police use of laser has also been countered with laser detectors, such as described in U.S. Pat. Nos. 5,206,500, 5,347,120 and 5,365,055, each of which is incorporated herein by reference. Products are now available that combined laser detection into a single product with a microwave receiver, to provide comprehensive protection.

The DSP or microprocessor in a modern radar detector is programmable. Accordingly, they can be instructed to manage all of the user interface features such as input switches, lights, sounds, as well as generate control and timing signals for the microwave receiver and/or laser detector. Early in the evolution of the radar detector, consumers sought products that offered a better way to manage the audible volume and duration of warning signals. Good examples of these solutions are found in U.S. Pat. Nos. 4,631,542, 5,164,729, 5,250, 951, and 5,300,932, each of which is hereby incorporated by reference, which provide methods for conditioning the response generated by the radar detector.

Methods for conditioning detector response are gaining importance, because there is an increasing number of signals present in the X, K, and Ka bands from products that are completely unrelated to police radar. These products share the same regions of the spectrum and are also licensed by the FCC. The growing number of such signals is rapidly undermining the credibility of radar detector performance. Radar detectors cannot tell the difference between emissions from many of these devices and true police radar systems. As a result, radar detectors are increasingly generating false alarms, effectively "crying wolf", reducing the significance of warnings from radar detectors.

One of the earliest and most prevalent unrelated Microwave sources is the automatic door system used in many commercial buildings such as supermarkets, malls, restaurants and shopping centers. The majority of these operate in the X-Band and produce signals virtually indistinguishable from conventional X-Band Police Radar. Other than the fact that door opening systems are vertically polarized, vs circular polarization for police radar, there is no distinction between the two that could be analyzed and used by a receiver design.

Until recently, virtually all of the door opening systems was designed to operate in the X-Band. As a result, radar detectors generally announced X-Band alerts far more often than K-Band. As these X-Band >polluters= grew in numbers, ultimately 99% of X-Band alerts were from irrelevant sources. X-Band alerts became meaningless. The only benefit that these sources offered the user was some assurance that the detector was actually capable of detecting radar. It also gave the user some intuition into the product=s detection range. To minimize the annoyance to users, most radar detector manufacturers added a filter-like behavior that was biased against X-Band sources. Many also added "Band priority" that was biased against X and in favor of bands that were less likely to contain irrelevant sources such as K, Ka, and Laser. If signals in both X and K Bands were detected, band prioritization would announce K, since it was more likely be a threat to the driver. In the last few years, K-Band door opening systems have also grown in number. This has reduced the significance of the K-Band warning and further undercut the overall benefit to the user of a radar detector.

Another unrelated microwave signal is generated by traffic management systems such as the ARTIMIS manufactured by TRW, used in Cincinnati, Ohio. ARTIMIS Stands for "Advanced Regional Traffic Interactive Management and Information System", and reports traffic flow information back to a central control center. Traffic congestion and other factors are analyzed by the control center. Control center employees use this information to formulate routing suggestions and other emergency information, which they transmit to a large distribution of overhead and roadside signs. In order to collect information on vehicle traffic, a roadside ARTIMIS station transmits an X-Band signal toward cars as they drive by. The ARTIMIS source, unlike the X-Band door opener systems, is distinguishable from police radar as it is not transmitted at a single fixed frequency. As a result, it is possible to differentiate police radar signals from sources such as ARTIMIS, and ignore ARTIMIS sources in newer detectors. Older detectors, however, do not incorporate this feature and could be obsolete in areas where ARTIMIS is in use.

Unrelated Microwave signals are also transmitted by a system called the RASHID VRSS. Rashid is an acronym for Radar Safety Brake Collision Warning System. This electronic device warns heavy trucks and ambulances of hazards in their path. A small number of these RASHID VRSS units have been deployed. They are categorized as a member of the >non-stationary= set of unrelated sources. As in the ARTIMIS example, detection of RASHID can be prevented.

Perhaps the biggest source of non-stationary unrelated source is from other radar detectors. These are sometimes referred to as "polluting radar detectors", and present a serious threat to some detector products. An early example of this occurred in the mid 1980's when radar detectors using superhomodyne circuitry became popular. Such detectors leak energy in the X-Band and K-bands and appeared as police radar to other detectors. A solution to this problem is described in U.S. Pat. No. 4,581,769, which is hereby incorporated by reference in its entirety. A similar problem occurred in the early 1990's when the Ka band was widened. An unexpected result was that the wider Ka band then also detected harmonics of signals generated by local oscillators within many existing radar detectors. U.S. Pat. No. 5,305,007, which is hereby incorporated by reference in its entirety, describes a method for ignoring these polluting detectors.

At this time, there are very few signal sources that can cause false laser detections in comparison to the substantial list of false microwave signals just described. However there are certain types of equipment that can cause the amplifiers and detection circuitry used in a laser detector to generate a "false" detect. In particular, certain locations near airports have been demonstrated to cause such problems for various laser detector products. As a result, selected airport environments are examples of stationary signals that produce false laser detections.

As can be appreciated from the foregoing example, as sources of unrelated signals continue to propagate, radar detectors must continually increase in sophistication to filter unrelated sources and accurately identify police radar. Each of these changes and enhancements has the potential effect of obsoleting existing detectors that do not include appropriate countermeasures. Furthermore, some sources, particularly stationary door opener sources, at this time cannot be filtered economically, and thus threaten the usefulness of even the most sophisticated modern radar detector.

During the 1980's, the functionality of radar detectors expanded into other classes of driver notification. A system was developed that required a special transmitter be placed on emergency vehicles, trains, and other driving hazards. The term >emergency radar= was coined, and a variety of products were introduced that could detect these transmitters. One such solution was disclosed in U.S. Pat. No. 5,559,508, which is hereby incorporated by reference herein in its entirety. Another system was later introduced offering a larger class of >hazard categories= called the SWS system. Both emergency radar and SWS involve the transmission of microwave signals in the >K= band. Such signals are considered to be a part of the group of signal types that are intended to be detected by radar detectors.

A drawback of these warning systems is that stationary transmitters of these signals send the same message to drivers constantly, and become a nuisance during daily commute. This is beneficial to >new= drivers receiving the message for the first time. However these messages become an annoyance to drivers who follow the same path to work everyday.

Thus, radar detector manufacturers are continually confronted with new problems to solve, due to the variety of different types of unrelated sources and their sheer numbers. The rate at which new or upgraded radar detector models are introduced continues to increase as manufacturers try to evolve their products to manage the growing number of unrelated sources. Meanwhile, the market for radar detectors is shrinking because consumers are no longer interested in buying products that so quickly become obsolete.

SUMMARY OF THE INVENTION

The present invention overcomes these difficulties by providing a method of operating a radar detector that aids in the management of unrelated sources, and permitting the detector to dynamically improve its handling of unrelated sources. As noted above, many non-stationary sources can be identified and ignored using existing technology. However, many stationary sources cannot, as yet be effectively filtered economically with existing technology. Accordingly, the invention provides a radar detector that includes technology for determining the location of the detector, and comparing this location to the locations of known stationary sources, to improve the handling of such detections.

In one embodiment, a radar detector may ignore detections received in an area known to contain a stationary source. In the specific embodiment described below, substantially more sophisticated processing is performed to determine whether and what actions to take in response to a detection.

The Global Positioning Satellite System (GPS) offers an electronic method for establishing current physical coordinates very accurately. In the detailed embodiment described below, a radar detector utilizes a GPS system to determine its current position. The detector also maintain a list of the coordinates of the known stationary source "offenders" in non-volatile memory. Each time a microwave or laser source is detected, it will compare its current coordinates to this list. Notification of the driver will take on a variety of forms depending on the setup configuration.

By adding GPS conditioning capabilities to a radar detector, the combination becomes a new product category that is capable of rejecting signals from any given location no matter what the nature of the microwave/laser signals might be from that location. This will have a dramatic effect on the usable life of the product and subsequent value to its owner.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 7A illustrates the active functions in the three threshold sensitivity modes (highway, auto, and city). The functions are Slow Speed Cancellation, H&K Band Signal Filter, and City Gain.

DETAILED DESCRIPTION OF SPECIFIC EMBODIMENTS

Figure 1:
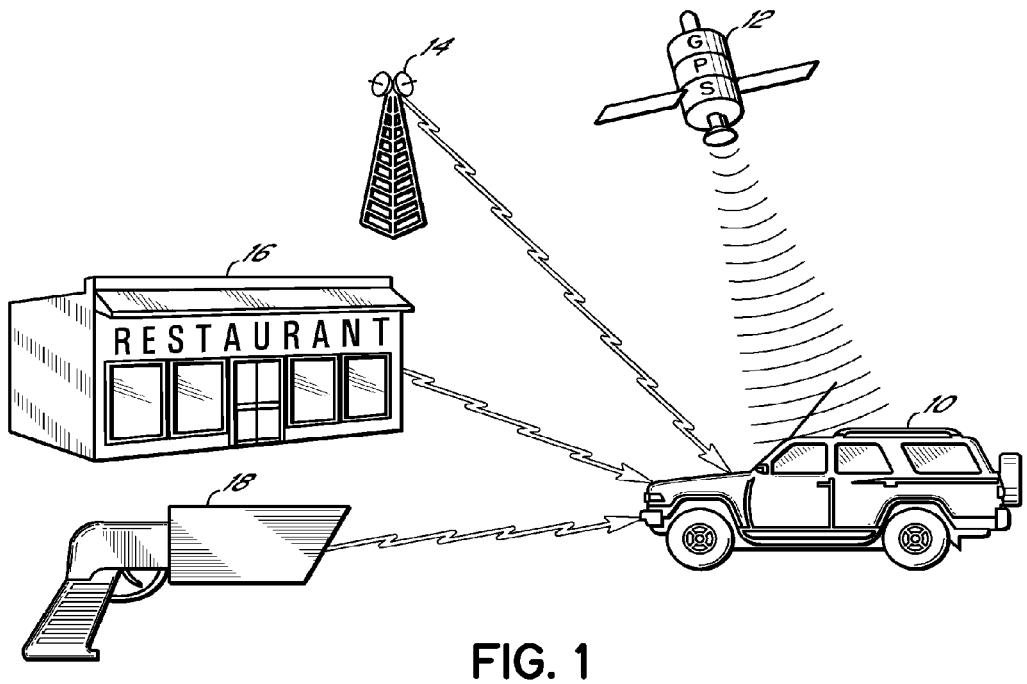
FIG. 1 is an illustration of a vehicle receiving radar signals from police radar and from a number of unrelated sources, and further receiving global positioning signals from a global positioning satellite.

To provide background for the present invention, a summary of GPS (Global Positioning System) technology will now be provided. GPS is a mature technology that provides a method for a GPS receiver to determine its relative location and velocity at any time. The (GPS) system is a worldwide constellation of 24 satellites and their ground stations. GPS receivers on earth use >line of sight= information from these satellites as reference points to calculate positions accurate to a matter of meters. Advanced forms of GPS actually enable measurements to within a centimeter. The Global Positioning System consists of three segments: a space segment of 24 orbiting satellites, a control segment that includes a control center and access to overseas command stations, and a user segment, consisting of GPS receivers and associated equipment. Over time GPS receivers have been miniaturized to just a few integrated circuits and have become very economical.

An unfortunate side effect of the GPS system is that it can be used by enemy forces, as GPS signals can be picked up by any receiver including both domestic and foreign. When the United States Department of Defense devised the GPS system they incorporated a feature that prevents high precision measurements unless the receiver is equipped with special military >keys.= This is accomplished with the intentional introduction of "noise" into the satellite's clock data which adds noise (or inaccuracy) into position calculations. The DOD sometimes also sends slightly erroneous orbital data to the satellites, which is transmitted back to receivers on the ground. This intentional degradation is referred to as "Selective Availability" or "SA" error. Military receivers use a decryption key to remove the SA errors. As a result of the SA error, there are two classes of GPS service, "Standard Positioning Service (SPS) and "Precise Positioning System" (PPS). These classes are realized by having GPS satellites transmit two different signals: the Precision or P-code and the Coarse Acquisition or C/A-code. The P-code is designed for authorized military users and provides PPS service. To ensure that unauthorized users do not acquire the P-code, the DOD can engage an encryption segment on the P-code called anti-spoofing (AS). The C/A-code is designed for use by nonmilitary users and provides SPS service. The C/A-code is less accurate and easier to jam than the P-code. It is also easier to acquire, so military receivers first track the C/A-code and then transfer to the P-code. Selective availability is achieved by degrading the accuracy of the C/A-code.

The precision of SPS is stated as providing 100-meter horizontal and 156 meter vertical accuracy A95% of the time.@ PPS is only available for the U.S. and allied military, certain U.S. Government agencies, and selected civil users specifically approved by the U.S. Government. PPS provides 22 meters horizontal and 22.7 meters vertical accuracy 95% of the time.

Other than intentional errors inserted by the DOD, there are a variety of other error sources that vary with terrain and other factors. GPS satellite signals are blocked by most materials. GPS signals will not pass through buildings, metal, mountains, or trees. Leaves and jungle canopy can attenuate GPS signals so that they become unusable. In locations where at least four satellite signals with good geometry cannot be tracked with sufficient accuracy, GPS is unusable.

The "Differential GPS" system was developed in order to compensate for the inaccuracy of GPS readings. A high-performance GPS receiver (known as a reference station or beacon) is placed at a specific location; the information it receives is then compared to the receiver=s location and corrects the SA satellite signal errors. The error data is then formatted into a correction message and transmitted to GPS users on a specific frequency (300 kHz). A true or arbitrary set of coordinates is assigned to the position occupied by a reference GPS receiver. The difference between these and the coordinates received via GPS at the reference is a very close approximation to the SA error at nearby sites. This error is nearly identical to the error calculated by any nearby GPS receiver. The reference site is sometimes referred to as a 'beacon', as it constantly transmits these difference coordinates. A DPGS receiver is designed to receive both the GPS information and the beacon information. It generates a far more accurate estimate of its coordinates by applying the difference information to the GPS coordinates. The drawback to this is that the remote and reference receivers may not be using the same set of satellites in their computations. If this is the case, and the remote receiver incorporates the corrections, it may be accounting for satellite errors that are not included in its own measurement data. These corrections can make the differential solution worse than the uncorrected GPS position. To prevent this error, an improved form of differential GPS involves the derivation of the corrections to the actual measurements made at the reference receiver to each satellite. By receiving all of the corrections independently, the remote receiver can pick and choose which are appropriate to its own observations. This method of DGPS is most widely used. Typically, the DGPS correction signal loses approximately 1 m of accuracy for every 150 km of distance from the reference station.

The availability of Beacons for DGPS systems elevates the very threat that the SA error was intended to reduce. In the presence of such networks, potentially hostile weapons systems using DGPS could be developed relatively rapidly. For this reason and others, the SA error has diminished in military significance. The White House has Directed that the S/A error be "Set to Zero" by the year 2006.

In the United States, the US Coast Guard (USCG) and Army Corps of Engineers (ACE) have constructed a network of Beacon stations that service the majority of the eastern United States, the entire length of both coastlines, and the Great Lakes. Further plans exist to increase the density of this network to provide dual redundant coverage throughout the continental US by the end of the year 2000 for a variety of applications including intelligent transportation system, infrastructure management, and public safety.

The Canadian Coast Guard (CCG) provides coverage in Canada for the St. Lawrence River, throughout the Great Lakes, and both coastlines. In total, there are over 160 stations operational worldwide with over 140 sites proposed to come online within the next two years. Coverage currently exists in many other regions of the world including Europe, Asia, Australia, Africa, and South America.

The beacons perform the differential calculation and broadcast this information by modulating the data onto a 300 kHz signal transmitted by the established network of Radiobeacons. The advantages of using the Beacon DGPS network include: (1) Free access to differential correction information; (2) Long range signal which penetrates into valleys, and travels around obstacles; (3) High quality differential corrections which are continuously monitored for integrity; and (4) Inexpensive user equipment.

The range of the 300 kHz signal is dependent upon a number of factors which include transmission power and conductivity of the surface over which the transmission is propagating. The Beacons within the global network broadcast at varying power. Typical broadcasting ranges for radiobeacons vary from as little as 35 nautical miles to as much as 300 nautical miles. Signals broadcast by DGPS radiobeacons are integrity monitored by remote stations for quality of beacon transmission, differential corrections, and GPS positional information. In addition, government agencies concerned with public safety have made it their mandate to ensure that beacon DGPS services are available 24 hours a day, 365 days a year. Performance requirements for marine applications dictate that an availability of 99% or greater is required if a particular system is to be used as a sole means of navigation. The US Coast Guard and Army Corps of Engineers Beacon Network, for example, offer this high level of availability free of charge to all civilian users.

There are other navigation systems in place, in addition to GPS, that merit review. LORAN-C is a ground-based radio navigation system. It operates on a frequency band of 90 kHz to 110 kHz (LF). It has an approximate range of hundreds to thousands of miles, and an accuracy of 0.25 nautical miles repeatable to 18-90 meters, with 95% confidence. Loran-C is a pulsed hyperbolic system that provides 0.25 nm predictable accuracy, 18-90 m repeatable accuracy, 95% confidence and 99.7% availability. Loran-C provides coverage for the continental U.S. and its coastal waters, the Great Lakes, and most of Alaska. Many other countries are also involved in the providing of Loran-C (or Loran-like) services, or are in negotiations with their neighbors to expand coverage. These countries include India, Norway, France, Ireland, Germany, Spain, Italy, Russia, China, Japan, the Philippines and others.

Omega is a low frequency band system with accuracy of 2 to 4 nautical miles with 95% confidence level. Developed by the United States, it is operated in conjunction with six other nations. OMEGA is a very low frequency, phase comparison, worldwide radio navigation system TACAN operates in the U.S. in a frequency band of 960 MHz-1215 MHz (UHF). It has a range of approximately 200 miles at high altitudes. TACAN is primarily used by U.S. and other military aircraft. TACAN radio stations are often co-located with civilian VOR systems allowing military aircraft to operate in civil airspace. The system provides the pilot with relative bearing and distance to the radio beacon.

VOR operates in a frequency band of 108.0 MHz-117.95 MHz (VHF). It has an approximate range of 250 miles, but accuracy as poor as 20 miles. VOR is a beacon-based navigation system operated in the U.S. by the Federal Aviation Administration (FAA) for civil aircraft navigation. When used by itself, the system allows users to determine their azimuth from the VOR station without using any directional equipment. VOR stations are radio beacons that transmit two signals. The first, called the reference signal, is transmitted with constant phase all around the transmitter. The second signal is phase shifted from the first depending on the compass direction of the user from the station. A simple, inexpensive receiver in the aircraft is used to determine the received phase difference of the two signals, and from that information the direction of the aircraft from the transmitter. By using two VOR stations, a specific location may be determined.

Of all the navigation systems mentioned, GPS offers better service, more accuracy, and more serviceable regions than any other approach. There are various classes of GPS service that improve accuracy at higher costs. These include the following categories: (1) Low-cost, single receiver SPS projects (100 meter accuracy); (2) Medium-cost, differential SPS code Positioning (1-10 meter accuracy); (3) High-cost, single receiver PPS projects (20 meter accuracy); (4) High-cost, differential carrier phase surveys (1 mm to 1 cm accuracy); and (5) High-cost, Real-Time-Kinematic (1 cm) with real time accuracy indications.

Referring now to FIG. 1, a vehicle 10 is illustrated in operation on a roadway, under exposure to radio frequency signals from a variety of sources. These include the GPS satellite system, LORAN or OMEGA radio towers, non-police sources of interference such as restaurant 16, and police radar signals from a radar gun 18. In accordance with principles of the present invention, vehicle 10 is equipped with a radar detector able to identify the present coordinates and/or velocity of the vehicle, e.g. using an associated GPS receiver or alternatively a receiver of land-based signals such as LORAN. The radar detector is able to use this information to enhance its decision-making abilities.

Figure 2:
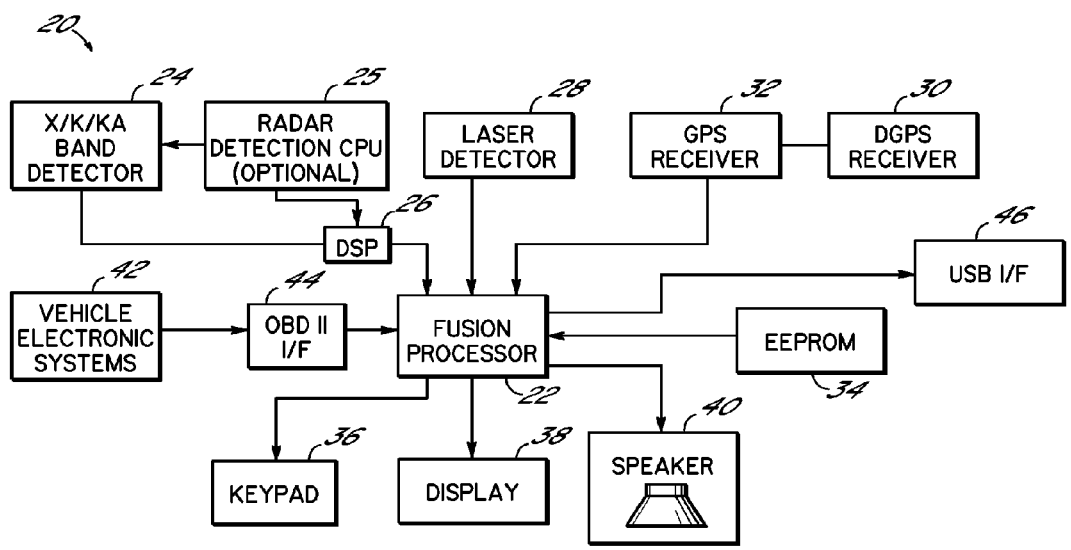
FIG. 2 is an electrical block diagram of a radar detection circuit in accordance with principles of the present invention.

Referring now to FIG. 2, the radar detector 20 in accordance with principles of the present invention includes a fusion processor 22 for controlling all functions of the unit. Fusion processor receives information on radar signals from a conventional microwave receiver 24, coupled to processor 22 via a digital signal processor (DSP) 26. Microwave receiver 24 and DSP 26 may utilize any of the techniques described above and in the above-referenced patents, for rejecting noise and increasing discrimination between actual and spurious police radar signals. Further, receiver 24 and DSP 26 may be controlled by an optional second CPU 25, which can enable additional signal evaluation beyond that which is possible using a DSP.

Processor 22 is further connected to a laser detector 28 for detecting police LIDAR signals. Processor 22 is further connected to a GPS receiver 32 and a separate differential GPS (DGPS) receiver 30, such that differential GPS methodologies may be used where beacon signals are available. Since the radar detector application described in this patent is not a candidate for military class service, it is not able to access the more accurate PPS. However it is considered a "civil user" and can use the SPS without restriction.

Processor 22 executes a stored program, found in an electrically erasable programmable read only memory (EEPROM) 34, flash memory, or masked read only memory (ROM). The processor is programmed to manage and report detected signals in various ways depending on its stored program. This programming includes functions for "detector response conditioning," as elaborated below, e.g., with reference to FIGS. 6A through 6D.

The radar detector further incorporates a user input keypad or switches 36. Operational commands are conveyed by the user to processor 22 via the keypad. Processor 22 is further connected to a display 38, which may comprise one or more light emitting diodes for indicating various status conditions, or in a more feature-rich device, may include an alphanumeric or graphical display for providing detailed information to a user. A speaker 40 is also provided to enable processor 22 to deliver audible feedback to a user under various alert conditions, as is elaborated below.

Processor 22 may further include an interface 44, such as an OBD II compliant interface, for connection to vehicle electronic systems 42 that are built into the vehicle 10. Modern vehicles are being equipped with standardized information systems using the so-called OBD II standard interface. This standard interface is described in an article entitled OBD II Diagnostics, by Larry Carley, from Import Car, January 1997, which is hereby incorporated herein by reference. Processor 22, using the OBD II standard interface 44, can obtain vehicle speed and other vehicle status information directly from the vehicle, and then may use this information appropriately as described in more detail below.

Processor 22 is further coupled to a Universal Serial Bus (USB) interface 46 (which may be of the series "mini-B" variety) that provides a means for uploading and downloading information to and from processor 22. It should be noted that there are three types of USB connection, Series "A", "B", and "mini-B". The series "mini-B" receptacle has the dimensions 6.9 mm by 3.1 mm, whereas series "A" has the dimensions 12.5 mm by 5.12 mm. The standard USB is of the series "A" variety. In one embodiment the present invention contemplates the use of the series "mini-B" receptacle. The "mini-B" would utilize less space on the detector than the standard series "A" USB. USB interface 46 may be used to automate the assimilation of coordinate information into data structures in EEPROM 34, as described below with reference to FIGS. 3 through 6. USB interface 46 may also be used to interface the detector to a separate host computer or product application containing a larger storage capacity than available from internal memory. Remote storage devices may include any form of dynamically allocatable storage device (DASD) such as a hard disk drive, removable or fixed magnetic, optical or magneto-optical disk drive, or removable or fixed memory card, or any device including a dynamic directory structure or table of contents included in the storage format to permit dynamic storage allocation. The host computer or other connected device need not be visible to the driver and may be in any convenient location, such as under the vehicle dash. USB interface 46 may also be used for the purposes of firmware upgrade. From time to time updates and bug fixes may become available, e.g. through a manufacturer website. USB interface 46 will enable the user to apply the appropriate firmware upgrade or bug fix, whereas in a prior embodiment the manufacturer would have conducted such an upgrade. USB interface 46 could also be used to add other user waypoints. The Internet provides a convenient means for storing and accessing repositories of information. Web sites may be established and devoted to this task, and provide several convenient types of training information. One could be a training file containing the coordinate information from the online "Speed Trap Registry" at the Internet site www.speedtrap.com. This information would be usable to set "always warn" bits at the locales of known speed traps. A second type of training information would be training files submitted by individuals for use in particular areas, and the third type of information would be aggregate training files created by integrating individually-submitted information into single files organized by region. Aggregate training files would be managed and updated by the web site administrator.

Coordinate information can be stored, e.g., on a hard drive organized with an indexed database structure to facilitate rapid retrieval, and the hard drive may include a special purpose processor to facilitate rapid retrieval of this information.

Where a general purpose host computer is connected via the USB interface, it will likely be based on a higher scale CPU chip and thus be able to efficiently carry out complex coordinate comparison tasks such as are described below, and such tasks may be delegated to the host CPU rather than carried out in fusion processor 22. The host CPU can also anticipate the need for information about particular coordinates based upon vehicle movements, and respond by retrieving records within proximity of the current location for ready delivery to fusion processor 22. The host computer can also provide navigational functions to the driver, potentially using stored signal information and flag bits to provide the user with location-specific information about driving hazards and potential police stakeout locations.

In a related embodiment, a multithreading processor 22 may be programmed to allow rapid continuous processing of the record database using two parallel threads. A slower background process is devoted to identifying records in the database that are nearest to the current position, and placing the nearest records, e.g., 25 such records, into an operating cache of the fusion processor. A higher speed foreground process may then repetitively and rapidly compares these 25 cached records to the current position. The foreground process may thereby provide decision-making upon a received signal within a 50 mS response time, as is required to acceptably condition any signal detected by the radar receiver in accordance with previously stored records. It will be noted that this approach permits records to be randomly allocated within the database in memory, simplifying the management of the flash memory.

Signal information may also be downloaded from various hosts, for example, a connection may be established directly via the USB interface to an Internet site carrying signal information, as is now done in a text form at the Internet site www.speedtrap.com. An indirect Internet connection may also be established via a host computer. Furthermore, connections may be established between two receivers, e.g. a trained receiver having extensive signal information, and a receiver having less extensive information, to transfer signal information between the receivers so that either or both has a more complete set of signal information.

Generally speaking, processor 22 compares the radar detector=s immediate coordinates with a stored list of the coordinates of unwanted stationary sources. If the radar detector receives a microwave/laser signal within a certain distance of one of these pre-designated sources, processor 22 applies additional constraints to the detection criterion before alerting the user. Since stationary radar sources make up the bulk of the unwanted sources, there is a significant benefit resulting from these functions. Further details on these operations are provided below with reference to FIGS. 6A through 6D.

Fusion processor 22 is programmed for efficient handling of repetitive tasks. One of the most highly repetitive calculations in the implementation described below, is the measurement of distance. Distance is defined as the square root of the sum of squares of Delta Latitude (Y) and Delta Longitude (x)

between current position and the position looked up in any given record. To speed this calculation, an approximation may be used to reduce the number of computations. Specifically, the magnitude approximation may be defined as one half of the absolute value of the larger Delta plus the absolute value of the smaller Delta.

Since GPS coordinates are on a sphere, the Latitude (Y) values are linear with respect to actual distance, however Longitude (X) values are not. When the magnitude function calculates distance between two points, it compensates for the Longitude error by scaling the Longitude's "Delta X" value by a "LongitudeFactor." Within a given region of the planet, the LongitudeFactor does not change much and is calculated at power-up and then much less frequently thereafter. The LongitudeFactor is chosen so that the high 16 bits of a u16× u16 multiply will contain the scaled Longitude.

Figure 3:
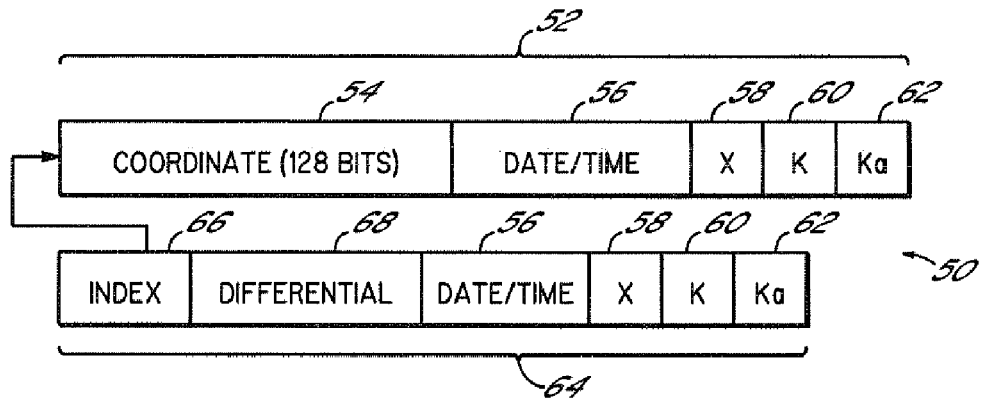
FIG. 3 is a illustration of a database structure used by the radar detection circuit of FIG. 2, for storing information radar signals received or receivable from unrelated sources at a number of locations, as identified by cell coordinates.

FIG. 3 illustrates one embodiment of data structures 50 stored in EEPROM 34 and used for managing information utilized in accordance with principles of the present invention. As seen in FIG. 3, these data structures include a plurality of main entries 52, each including a field 54 for a coordinate, a field 56 for identifying the date and time data was collected, and three fields 58, 60 and 62 providing information on the source.

Field 54 provides the coordinate. As will be elaborated below, coordinates provided by GPS receiver 32 are reduced in resolution to arrive at a "cell" coordinate, which indicates that the current location of the receiver, which can be within a relatively large (e.g., ⅛ or ¼ mile square) block of space on the Earth's surface. This approach reduces the storage requirements for information stored by the radar detector to a manageable level. The sizes of the cells can be variably adjusted based upon the available memory and the desired precision. In the present example, 128 bits are allocated to storing cell coordinates, so the cell coordinates can only have as much precision as can be provided in 128 bits a cell, e.g., by discarding the least significant bits of the coordinates. In other applications, different bit sizes and resolutions could be utilized. It will also be noted that the storage requirements can be reduced by designing the receiver for operation only in a specified part of the Earth, e.g., only in Europe, Japan or North America. By so doing, part of the coordinates for a cell will not need to be stored because they will be the same for all stored cells. In such an embodiment, whenever the coordinates provided by the GPS receiver fall outside of the pre-established region, the receiver will either disable all storage of information (if approved via operational input from the user), or establish a new region of interest and discard all data from previously identified regions. Alternatively, the operator may set the device in either a "precision" (high coordinate resolution) or "wide area" (low coordinate resolution) mode, based upon the driving habits of the driver. In "wide area" mode, the reduced resolution used for each cell coordinate permits a greater number of coordinates to be stored, albeit with reduced precision as to each coordinate. Rural drivers and others that often follow common paths, would be best suited to "precision" mode, whereas urban drivers would be better suited to "wide area" mode. As a further alternative, the detector may automatically select a mode based upon the memory consumption or the time lapse before the memory of the detector becomes full; if the memory fills rapidly, the unit would automatically switch to a "wide area" mode using low precision coordinates, whereas if the memory never fills or fills only slowly, the unit will remain in its "precision" mode.

The date and time information in field 56 is useful when selecting least recently used (oldest) entries in storage for replacement, as is described further below.

Fields 58, 60 and 62 store source incidence counters, one for each of a plurality of frequency blocks. Field 58 stores counter(s) for block(s) in the X band. Field 60 stores counter(s) for block(s) in the K band. Field 62 stores counter(s) for block(s) in the Ka band. The number of blocks in each band can vary in different embodiments of the present invention, and is a function of the signal frequency content details provided by the detector 24 and DSP 26. As one example, the X, K and Ka bands are divided into a total of 32 frequency blocks. Each block is provided a 4-bit counter in fields 58, 60 and 62. The counters have a minimum value of 0 and a maximum value of 15, and are a measure of the number of times a signal in the associated frequency block has been detected at that location. As will be described below in greater detail, the "source incidence" counters may be used in some embodiments, to aid in identifying geographic locations that appear to have spurious sources of police radar signals, due to repeated detection of such signals without confirmation of police activity.

In the data structures shown in FIG. 3, to save space, main entries 52 are interleaved with a greater number of differential entries 64, each of which stores information for a cell. A first field in a differential entry 64 is an index pointer 66 to a main entry 52, e.g. an index to a storage location at which the main entry is stored. A second field is a differential field 68 that identifies the difference between the coordinate of the differential entry 64 and the coordinate stored in the main entry 52. The index and differential can be stored in substantially fewer than 128 bits, so that a differential entry 64 is substantially smaller than a main entry, thus saving storage space. Differential entries further include a date and time field 56 and fields 58, 60 and 62 for storing counters for X, K or Ka frequencies, as described above.

Figure 4:
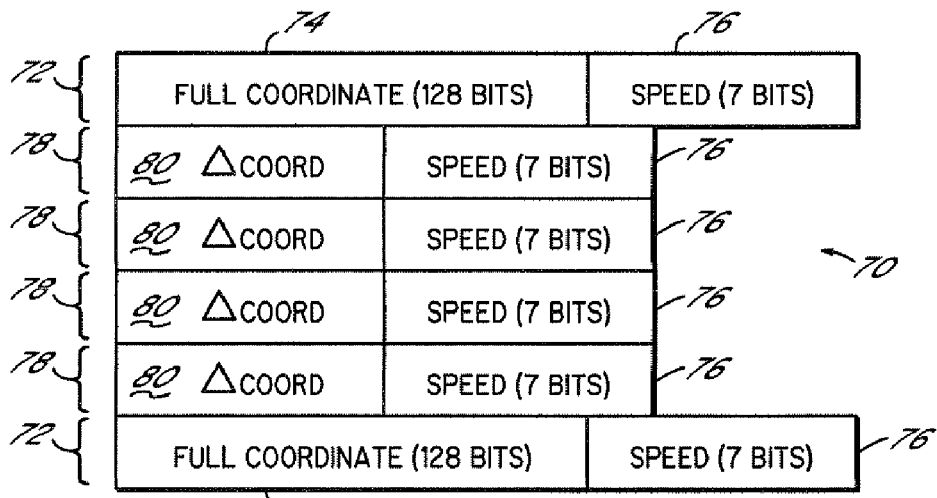
FIG. 4 is an illustration of a database structure used for storing historic information on the locations of a vehicle carrying the radar detection circuit of FIG. 2, as identified by cell coordinates.

FIG. 4 illustrates one embodiment of data structures 70 used to store vehicle motion history records or trip records in EEPROM 34. These data structures include main entries 72 which include field 74 storing a 128 bit cell coordinate, followed by a speed field 76 which can be, for example, 7 bits in length. Differential entries 78 associated with each main entry include a differential coordinate field 80 indicating the difference in the cell coordinate from the associated main entry 72, and a speed field 76 indicating a speed recorded at the cell. Because motion history records or trip records are stored sequentially during motion of the detector, differential entries 78 are stored after and adjacent to the associated main entry 72. Accordingly, differential entries 78 do not require an index field to associate the differential entry 78 with a main entry 72, because the association is implied from the location of the differential entry 78 in memory after its associated main entry 72.

History entries may be used for a number of purposes. For example, in the following description, history entries are accessed as part of defining an "everyday route" taken by the detector at the operator's identification. History entries may also be used for driver monitoring; they may be downloaded to a host PC via USB interface 46, and evaluated to determine whether the vehicle has taken abrupt turns, show excessive speed, or entered undesired locations, all of which may be useful in monitoring the activity, e.g., of teenage drivers. History entries may also be uploaded to PC to provide evidence of the driving history of the vehicle before and at the time of a police citation for speeding. If a driver has been unfairly cited for speeding, history records from the detector can provide compelling evidence to court that the citation is in error. For the purpose of enabling these uses, history entries stored by fusion processor 22 are encrypted when stored and cannot be modified by fusion processor 22 or any PC software supplied for viewing those entries.

Figure 5:
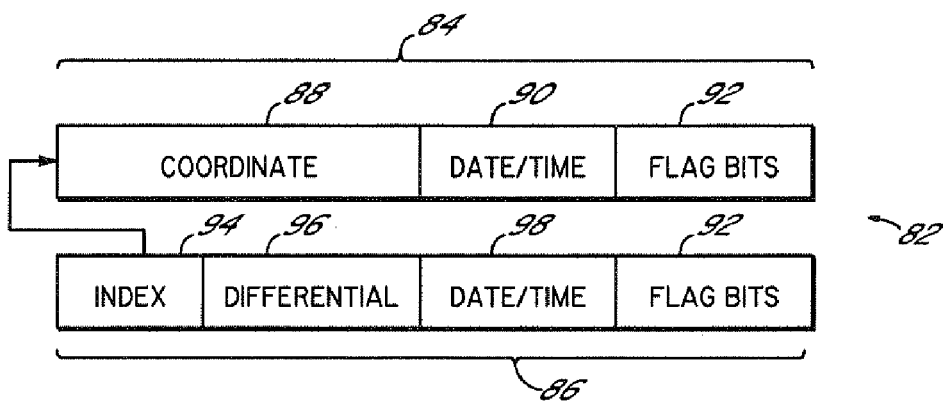
FIG. 5 is an illustration of a database structure used for storing flags identifying various conditions at a number of locations, as identified by cell coordinates.

FIG. 5 illustrates one embodiment of data structures 82 that can be used to store hazard information and other flag bits related to cells. These data structures 82 include main entries 84 which include a full 128 bit cell coordinate in field 88, followed by a date and time field 90 and flag bits 92 indicating the hazard or condition associated with the identified location. The differential entries 86 include an index field 94 pointing to one of the main entries, a differential coordinate field 96 indicating the difference in the cell coordinate from the associated main entry 84, a date and time field 98, and a set of flag bits 92 indicating the hazard or condition associated with the identified location. The flag bits may identify various hazard conditions. For example, in the specific embodiment described below, there is an "always warn" flag bit that indicates that police activity has previously been confirmed at the location, and therefore the user should be warned of all apparent police radar signals at the location. Further, there is a "location lockout" flag that indicates that broadband sources of spurious police radar signals have been experienced at the location, and therefore in the future warnings of police radar signals should be suppressed at the location. Similarly, a "minimal visual lockout" flag indicates that, due to the unwanted distraction of spurious police radar warnings at a location, only a minimal visual warning should be made of police radar signals identified at the location. It should be noted that a visual warning could be in the form of the current vehicle speed, which may more accurately display the vehicle speed than the vehicles on board speedometer. Alternatively, a "display speed" mode could be entered to continuously display the vehicle's speed, as elaborated below. The flag bits further include "frequency lockout" bits, one for each frequency block identified by the radar receiver. These bits identify frequencies at the location in which spurious police radar signals have previously been encountered, so that in the future apparent police radar signals at the same frequencies are ignored. The flag bits may also include additional flags to warn of other conditions, such as that there was construction at the identified location, or that some other cause for traffic slowdowns were seen at the identified location, to aid in vehicle navigation.

The information contained in the databases described above may be assimilated by the detector through operation, as is described below. Alternatively, this information may be pre-installed in the detector, e.g. via an upload from a host PC via the USB port 46. There would be substantial benefits to pre-training a detector in this way for a particular geographic area. By pre-training the detector, the driver would not have to endure the audible alerts that would naturally occur before it is trained for each source of spurious police radar signals. In a give area, the ideal training profile would not vary much from one detector to the next, since all detectors should reject the same sources in the same areas. As a result, there are few issues that would have to be resolved in order to transfer training information from one radar detector to another.

Training files would have low value if they could not be readily used by other detectors. The transferability of training files from one detector to another will depend on the differences in how real world signals are perceived by their embedded processors. In large part, these differences are a direct result of manufacturing and component variations. During the manufacturing process, a detector goes through a set of calibration steps in order to guarantee that the unit meets specifications for Spectral Band Coverage and Sensitivity. These calibration steps reduce the cost of designing the product since lower cost, poorer tolerance components can be used on the assumption that a final manufacturing calibration procedure will eventually compensate for the lower tolerance. Once calibrated, an acceptable product must also be able to perform over a predefined temperature range.

Component tolerance, manufacturing calibration, and operating temperature are key factors that determine how the spectrum of microwave signals are >viewed= by the embedded Microprocessor or DSP. Radar products convert the spectral band such as X-Band into an array of values that are proportional to the signal energy in consecutive slots or bins of the spectrum. In order for the product to be >in tolerance= these slot positions must be adjusted so they precisely cover the full range of X, K, and the Ka bands The calibration procedure is only concerned with guaranteeing that the slots provide adequate coverage of each band. It is less concerned as to whether any one of these slots falls on a precise physical frequency. Therefore the first frequency block in one detector will not necessarily be perceived at the same frequency as the first slot in another detector.

If training data is to be shared between various detectors, it will be necessary for supporting software to compensate for these variations. When new pre-trained data is supplied, the detector will undergo an authentication procedure in order to determine the relationships between the pre-train data and its own receiver configuration. This will be based on comparing the frequencies of newly encountered sources to those of the pre-train data at matching coordinates. By comparing the observed frequencies to those in the training set, a "correction profile" will be constructed, that represents the change between the pre-train data and the output of the local microwave receiver. At the end of the authentication procedure, the entire pre-training file will be incorporated into the active train data. During the authentication procedure, the user will be exposed to unconditioned detector responses. This authentication procedure will be substantially shorter than the training period of a virgin detector. Once authentication is complete, the user will receive a notification indicating that the product is switching from authentication over to normal operation. If the training mode is engaged, the authenticated data will continue to be massaged by new driving encounters, as detailed below.

Figure 6:
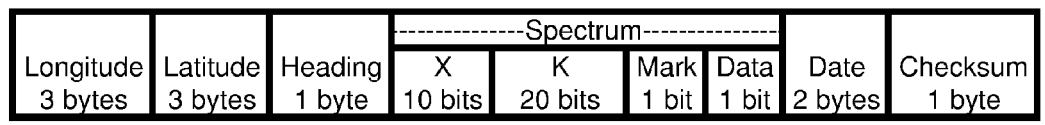
FIG. 6 is an illustration of an alternate database structure for storing locations and flags relating to those locations.

Referring now to FIG. 6, an alternate embodiment of a data structure for storing signal information can be explained. In this embodiment, coordinates and flags regarding those coordinates are stored in a simplified record structure, and source incidence counters are not implemented. In this embodiment, coordinate information is organized into 14-byte records, each identical to the others. A 4-megabit flash memory chip may be organized into 18432 of such records, although larger or smaller memory capacity may be provided in other implementations. The records are used both for locking out spurious signal sources, and for marking other points of interest, such as fast food locations, known locations of police activity, or the path of a frequently-used route.

As with the other database implementations described above, new record is created each time the user locks out or marks a location (by the depression of appropriate keys on the keypad)—unless the lockout or mark is performed within proximity to an existing lockout or mark, in which case the existing record is updated.

The structure of each record, as illustrated in FIG. 6, as follows:

3 bytes: Longitude (proportional to degrees); the GPS receiver output is rounded to a 24-bit value providing resolution of approximately 9 feet/bit.

3 bytes: Latitude (proportional to degrees); the GPS receiver output is rounded to a 24-bit value providing resolution of approximately 9 feet/bit.

1 byte: Heading in degrees/2

4 bytes: Spectrum 2 bytes: Record Date, usable for replacement of data on a FIFO basis 1 byte: Record Checksum The 4-byte (or 32 bit) "spectrum" field is further broken down as follows:

10 bits X Spectrum 20 bits K Spectrum 1 bit "Mark bit", which indicates that the record designates a marked location rather than a lockout location 1 bit "Data bit", which indicates that record designates data, not a lockout location If the "Mark bit" is set, the 30-bit field normally used for X & K spectrum is used to identify one of various available mark location types, including, e.g., "Camera", "Speed Trap", and "Other". Owing to the large number of bits available in the Spectrum field, a wide variety of mark types and data structures could also be defined, including for example a mark type that annotates a location along an everyday route, and a mark type that identifies a record as a history records which may, for example, use a portion of the spectrum field to identify measured speeds. In a specific embodiment, arrival at a marked location causes the detector to generate a display and/or audible warning associated with the type of location.

If the "Mark & Data" bits are clear in a record, the record is a lockout record, and any of the 30 bits in the X & K spectrum fields can be set to indicate locked out bands. The 10 bits of X Spectrum map the 100 mhz X band in 10 mhz increments, and the 20 bits of K Spectrum map the 200 mhz K band in 10 mhz increments. To compensate for variation of the source and receiver, a lockout of a given frequency is a realized by setting 3 bits in a given field, the bit corresponding to the frequency at which signal was detected, and its 2 neighbors.

The "Data" bit is used to identify a record that contains information on signal encounters. "Data" records may be used in automatic or adaptive signal rejection implementations such as the collection of source incidence counters in an everyday route or training mode, or other modes that collect detailed signal information.

Figure 6A:
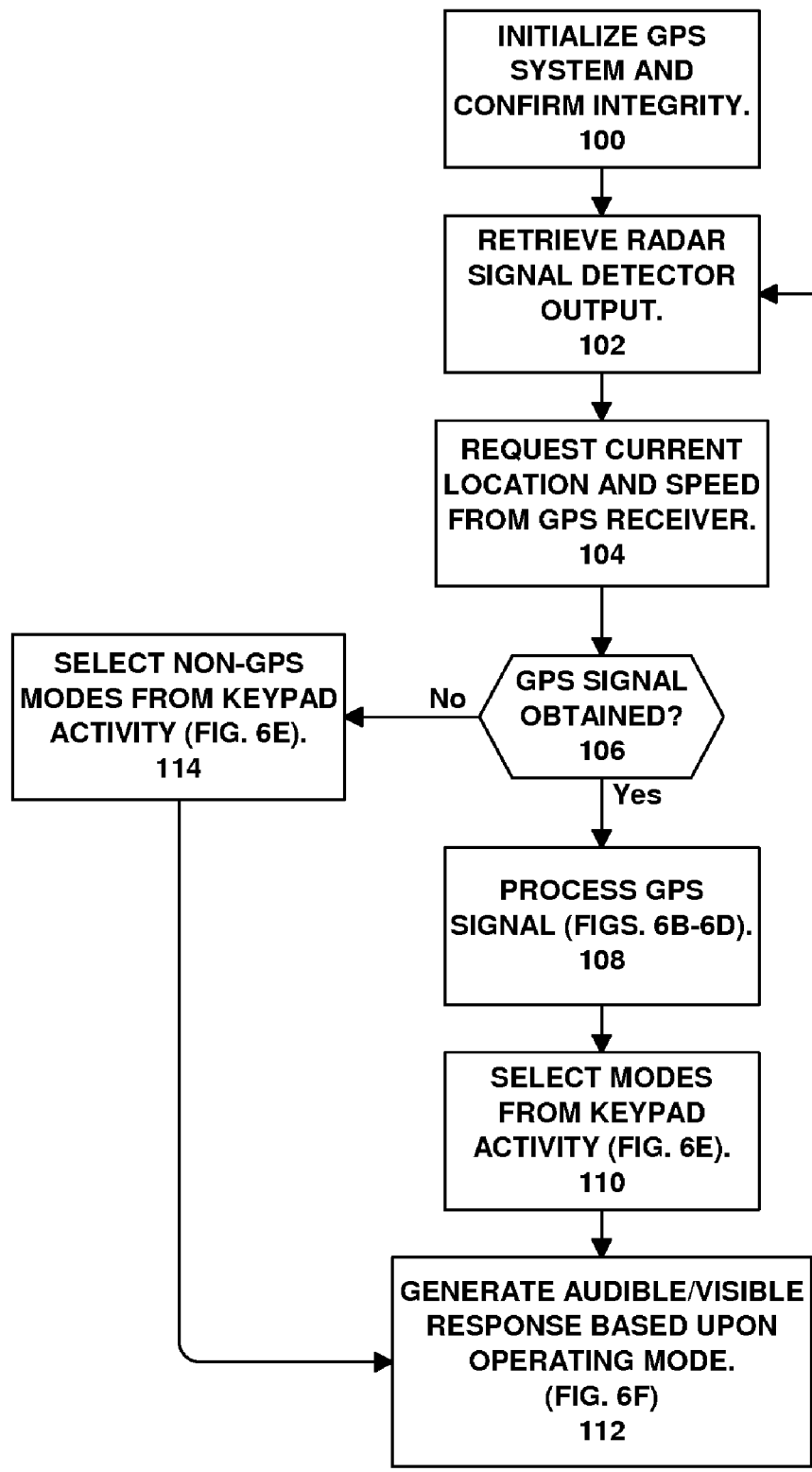
FIG. 6A is a flow chart of the operations of the CPU of the radar detector of FIG. 2, carrying out principles of the present invention.

Referring now to FIG. 6A, one embodiment of operations of the fusion processor 22 to carry out principles of the present invention can be described in greater detail. Fusion processor 22 performs a main loop of steps during regular operation of GPS enabled radar detection. This main loop of steps is illustrated in FIG. 6A and is detailed in FIGS. 6B through 6F.

When fusion processor 22 is initialized, i.e., when power to the GPS enabled radar detector is turned on, the device is initialized in step 100. This initialization step includes performing diagnostic checks on the various circuitry illustrated in FIG. 2 to insure its proper operation, as well as initialization of the GPS receiver 32 to insure GPS signals can be received accurately by fusion processor 22. In addition, various internal variables, such as a variable for identifying a current position, are initialized. The initial values are chosen to insure proper operation; for example, the current position variable is initialized to a value that will cause the first pass through the main loop FIG. 6A to include processing of a current location in steps 110 and 112 in accordance with FIGS. 6B-6E, as discussed below.

The first step in the main loop performed by fusion processor 22, is step 102, in which radar detection circuitry 24 and 26 is accessed to obtain information on police radar signals currently being received by the GPS enabled radar detector. In a subsequent step 104, fusion processor 22 communicates with GPS receiver 32 to request a current location and a current vehicle speed from the GPS receiver 32. This information can then be utilized in performing GPS related operations described in the following steps. As noted above, vehicle speed may also be obtained from the vehicle itself via an OBDII interface 44 if the vehicle in which the GPS enabled radar detector is installed has a suitable OBD connector for delivering vehicle speed information. It will be appreciated further that vehicle location information might also be obtained via an OBDII connector from a GPS receiver that may be built into the vehicle within which the GPS enabled radar detector is installed. When the vehicle in which the GPS enabled radar detector is installed has both vehicle speed and vehicle position information available via an OBDII connector, the GPS receiver 32 may not be used at all, or may not even be included in the GPS enabled radar detector, to facilitate cost reduction for the GPS enabled radar detector.

Following steps 102 and 104 in which current police radar and GPS related information is obtained, different actions are taken based upon whether GPS information is available. Specifically, in step 106 it is determined whether a GPS signal has been received. If a GPS signal is available, then all GPS enhanced functions of the radar detector may be performed. If no GPS signal has been received, then the radar detector will revert to processing police radar signals at a manner analogous to conventional non-GPS enabled radar detectors.

Assuming for the moment that a GPS signal is available in step 106, and therefore a current position for the vehicle is known, then in step 108 a sequence of steps is performed to process the GPS signal, as is further detailed below with reference to FIGS. 6B, 6C and 6D. This processing can include retrieval and/or updating of stored information, such as the police radar information and signal information database illustrated in FIG. 3, the vehicle history database illustrated in FIG. 4, the flag database illustrated in FIG. 5 and/or the signal record database illustrated in FIG. 6.

After processing the GPS signal, in step 110 keypad activity on keypad 36 is detected and processed to alter operating modes of the GPS enabled radar detector, as described below in further detail with reference to FIG. 6E.

After selecting appropriate modes based upon keypad activity, in step 112, an appropriate audible or visible response is produced by the GPS enabled radar detector based upon it current operating mode and the presence or absence of radar detector signal received in step 102. It should be noted that a visible response might also include the "display speed" function. After step 112, processing returns to step 102 to obtain a new radar detector signal output and a new current location and speed and then perform additional analysis of that data as described above.

As noted above, in some circumstances a GPS signal will not be available during operation of the GPS enabled radar detector. In this case, processing continues from step 106 to step 114 in which any non-GPS related operational modes may be activated based upon the activity at keypad 35. GPS enabled modes are unavailable so long as no GPS signal has been obtained, so the processing in step 114 eliminates those modes which cannot be activated in the absence of a GPS signal. After step 114, processing continues to step 112 in which an appropriate audible or visible response is generated based upon the current operating mode and the radar detected signal received in step 102.

In one embodiment, the processing of GPS signals in step 108 is implemented through a parallel signal tracking process. The signal tracking process generates and updates a cached list of signal tracking data. Each member of this list indicates a location, and signal spectrum information gathered while at that location. The signal tracking process is responsive to the current location and currently received radar signals, and generally operates to add members to a cached signal tracking list, or update existing members, whenever the radar receiver detects signal, and generally operates to delete members from the cached signal tracking list when those members become too distant from the current location. This signal tracking process thereby creates tracked signal information that is available for processing in the event that the user requests a lockout—in such a case all of the members of the signal-tracking list are examined and any member that meets certain criterion is stored in the database as a lockout record.

The signal tracking process described above utilizes two operating constants. These constants are described below, and representative values are identified:

Region Consolidation for Tracked Signals—0.3 miles: when spectral components are identified by the detector, the signal tracking process checks the tracked signal list for members within the region consolidation distance of the current position. If there is a member that is nearby, the spectral components that are currently identified are added to that list member. If the current position is greater than this distance from any member of the tracked signal list, then a new member is added to the tracked signal list, and initialized with the received spectral components.

Removal Distance for Tracked Signals—1.0 miles: Whenever current location is updated, any member of the tracked signal list that is greater than the removal distance from the current location is removed from the tracked signal list.

In the event of a lockout request from the user, selected members of the signal tracking list are processed to create lockout records, using three operating constants. These constants are described below, and representative values are identified:

Proximity For Lockout—0.5 miles: When the user requests a lockout, then those members of the tracked signal list that are within the proximity for lockout distance from the current position, selected for storage into lockout records in the memory.

Lockout Region Consolidation—0.35 miles: When a tracked signal list member is selected for storage into a lockout record, its position compared those of existing lockout records. If there is an existing record within the lockout region consolidation distance, the spectrum stored in the selected member of the signal list is added to the existing record. Otherwise, a new record is created in the memory, and the spectrum of the selected member of the signal list is added to the new record.

Unlock Removal Distance for Locked Regions—0.8 miles: When the user requests to unlock a location, all lock records in memory (regardless of their spectral content) that are within this distance of the current location, are removed from memory.

A final constant utilized in processing received radar signals is the Lockout Region Radius, which may be 0.5 miles: When radar is detected, the current position is compared to lockout records in memory, and if there is a lockout record that is within the lockout region radius of the current position, then a warning is suppressed or modified for all frequency bands that are marked in the record.

It will be noted that it is possible to drive through an array of interfering signals that span multiple 0.35-mile regions. In one implementation of the present invention, once the user requests a lockout, the receiver will remain in a lockout mode, and continue to generate lockout records, as appropriate, so long as any signal is continuously being tracked. Thus, if a lockout is requested in the midst of an array of signals spanning more than 0.35 miles, at each advance of 0.35 miles, a new lockout record will be created in memory and initialized with the spectrum received over the most recent 0.35 mile distance, until no further signal is received.

In various embodiments of the invention, a wide variety of operative modes may be selectable and controllable through the keypad. Possible modes include:

- a "warning suppression" mode in which warnings, particularly audible warnings, produced by the radar detector are suppressed so that they are not disturbing to the operator of the vehicle. The "warning suppression" mode may be either GPS based or non-GPS based.
- an "expert meter" mode in which detailed information regarding received warning signals are displayed on display 38 of the GPS enabled radar detector, as described in U.S. Pat. No. 5,668,554, which is hereby incorporated by reference herein in its entirety.
- a "data overwrite" mode in which the GPS enabled radar detector saves, into the signal information database of FIG. 3, data regarding any location not previously stored in the database, even when this signal information database is full, by overwriting the oldest data in the signal information database when necessary. When the "data overwrite" mode is disabled, then the signal information database will not be overwritten once it becomes full.
- a "frequency lockout" mode, in which police radar frequencies detected by the receiver are taken to be from non-police sources, and appropriate records are stored. The "frequency lockout" mode is engaged by the vehicle operator when non-police radar signals are being received and the operator wishes to suppress future warning signals caused by the same sources at the same geographic locations. As noted below, "frequency lockout" mode can only be engaged while the GPS enabled radar detector is detecting an apparent police radar signal and will be automatically disengaged when this signal is no longer being received.
- a "location lockout" mode, in which the flag database of FIG. 5 is updated to suppress all audible warnings of radar signals at the current location of the vehicle. As is the case with the "frequency lockout" mode, the "location lockout" mode will be enabled by a vehicle operator when the vehicle is near to a known source of spurious police radar signals of a broadband character. The "location lockout" mode can only be engaged while the GPS enabled radar detector is detecting an apparent police radar signal, and will be automatically disengaged whenever a police radar signal is no longer being received from the GPS enabled radar detector.
- a "minimal visual lockout" mode, in which the flag database of FIG. 5 is updated to suppress most or all visual warnings of radar signals at the current location of the vehicle. The "location lockout" mode will be enabled by a vehicle operator when the vehicle is near to a known source of spurious police radar signals of a broadband character, and at that location does not wish to be disturbed by even a visual radar signal warning. The "location lockout" mode can only be engaged while the GPS enabled radar detector is detecting an apparent police radar signal, and will be automatically disengaged whenever a police radar signal is no longer being received from the GPS enabled radar detector.

a "display speed" mode, in which the vehicles current speed is continuously displayed a "police confirmation" mode, in which flags in the flag database of FIG. 5 will be set to insure a warning signal is always delivered for any police radar signal received at the current vehicle location. The "police confirmation" mode will be activated by a vehicle operator upon sighting a police stakeout.

a "training" mode, in which the GPS enabled radar detector will store signal information for all geographic locations that the GPS enabled radar detector reaches or passes during operation. When "training" mode is disabled, the signal incidence counters found in the signal information database of FIG. 3, will not be modified by the GPS enabled radar detector during its normal operation.

a "route identification" mode in which the route currently traveled by the vehicle is memorized by the GPS enabled radar detector to be subsequently referenced in performing radar detection. Using "route identification" mode, a user may establish one or more everyday routes traveled by the vehicle, and cause the GPS enabled radar detector to continuously update its signal incidence information in the signal information database of FIG. 3 whenever one of these routes are traversed. Routes are identified by an operator by entering the "route identification" mode at the beginning a route, and then exiting the "route identification" at the end of the route.

Figure 6B:
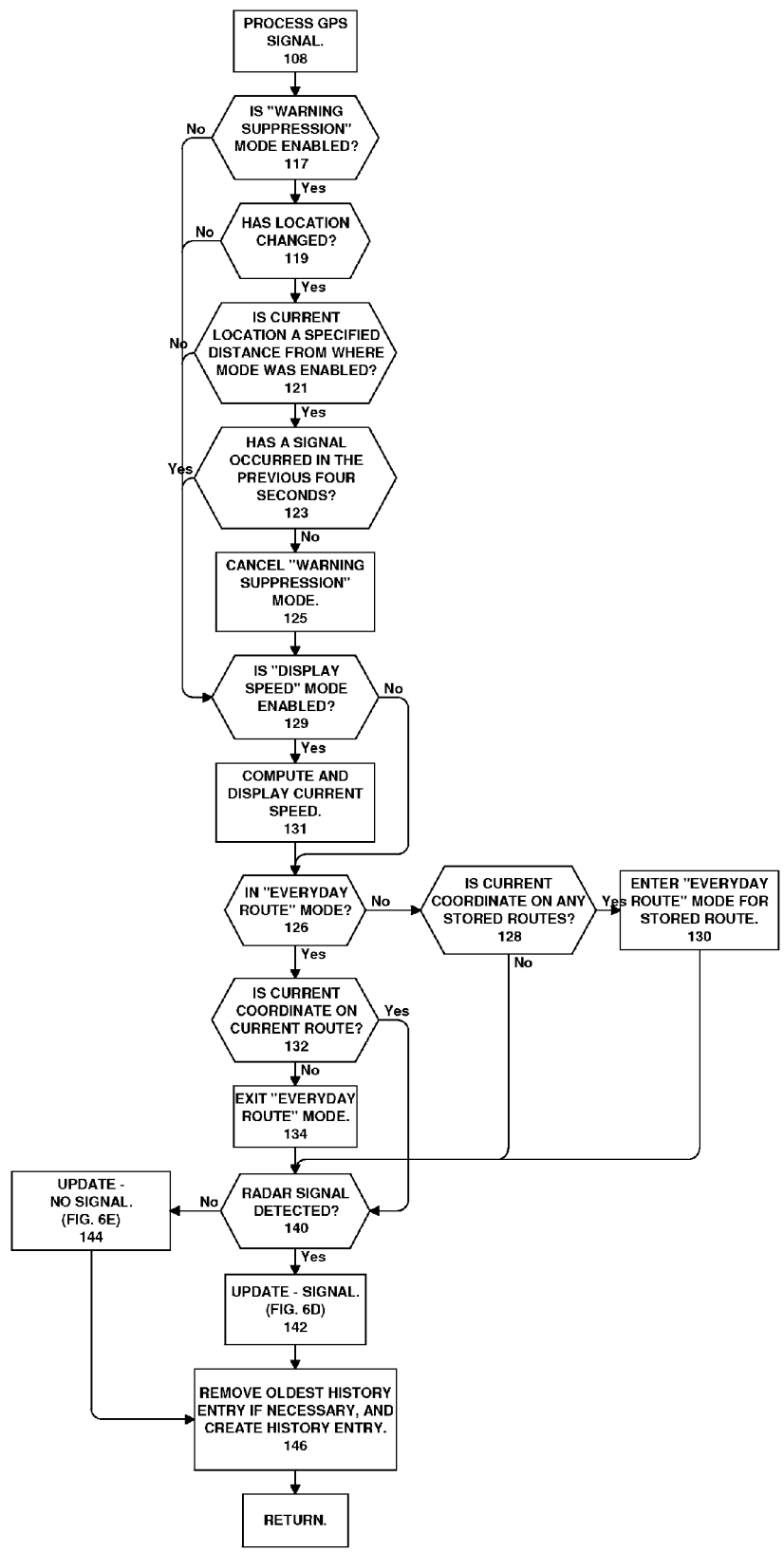
FIG. 6B is a flow chart of operations of the CPU of FIG. 2 in processing GPS information when GPS signals are being received.

Referring now to FIG. 6B, in one particular embodiment, the processing performed on a GPS signal in step 108 of FIG. 6A can be described in greater detail. In step 117, the fusion processor determines whether "warning suppression" mode has been enabled. If so, then the fusion processor determines 119 whether the current location is different from the previous location; if not, the "warning suppression" mode is continued. If the current location is different from the previously identified location, the fusion processor determines 121 whether the current location is more than a specified distance from the location where the "warning suppression" mode was enabled, if not, then the "warning suppression" mode is continued. If the current location is more than a specified distance from the location that the "warning suppression" mode was enabled, the fusion processor determines 123 whether a predetermined mute time, e.g., four seconds, has elapsed without the detection of radar; if not then the "warning suppression" mode is continued, otherwise, "warning suppression" mode is cancelled 125.

After the above-described processing relating to "warning suppression" mode, the fusion processor determines 129 whether the "display speed" mode has been enabled; if so, the current speed is computed and displayed 131. Thereafter, steps are taken to manage "everyday route" modes of the GPS enabled radar detector, if implemented. As noted above, the user of the GPS enabled radar detector may establish one or more everyday routes traveled by the vehicle and cause the GPS enabled radar detector to, along those routes, continuously update its signal incidence information. Accordingly, if these modes are implemented, when the GPS enabled radar detector detects that it is following one of these everyday routes, then it will automatically enter its everyday route mode, and subsequently perform different processing (as further described below in connection with FIGS. 6C and 6D). As seen in FIG. 6B, (a.) if the detector has been following an everyday route, an evaluation is made whether the GPS enabled radar detector is continuing to follow the previously defined everyday route, or (b.) if the detector has not been following an everyday route, a determination is made whether the GPS enabled radar detector has started following a previously defined everyday route.

In the first step of this process, in step 126 it is determined whether the GPS enabled radar detector is already in its "everyday route" mode. If the radar detector is not currently in its "everyday route" mode, then it is determined whether the radar detector is entering an everyday route; specifically, in step 128, it is determined whether the current coordinate is on any of the pre-stored everyday routes. If the current coordinate is on one of the everyday routes, then the GPS enabled radar detector will determine that the vehicle carrying the detector is beginning or joining one of these pre-stored routes. In such a case, in step 130 the GPS enabled radar detector will enter its "everyday route" mode for the stored route containing the current coordinate. If the current coordinate is not on any stored route, step 130 is bypassed.

Returning to step 126, if the GPS enabled radar detector is already in its "everyday route" mode, then it is determined whether the detector is continuing to follow this route. In this case, processing proceeds from step 126 to step 132 to determine whether the everyday route is being followed. Specifically, in step 132 it is determined whether the current coordinate is on the current everyday route. If not, then in step 134 the GPS enabled radar detector exits "everyday route" mode, indicating that the vehicle is no longer on the previously stored everyday route. Otherwise, step 134 is bypassed, and the detector remains in its "everyday route" mode.

Following step 134 or immediately following step 130, additional steps are performed to determine whether and how to update previously stored signal incidence information in the signal information database of FIG. 3. Processing also proceeds to step 140 from steps 132 or directly from step 128 based upon conditions described above.

In step 140 it is determined whether a radar signal is being received by the GPS enabled radar detector. If so, then in step 142 the procedure described below with reference to FIG. 6C is performed to update, as needed, the signal information database. If no radar signal is being currently detected, then in step 144 the process described below with reference to FIG. 6D is performed to update, as needed, the signal information database. After step 142 or 144, in step 146 if the detector implements a history database, that database is updated by removing the oldest history entry from that database (if necessary to make room), and creating a new history entry for the current cell. The new history entry will include the cell coordinate or a differential coordinate as discussed above with reference to FIG. 4, and would also include a vehicle speed as obtained in step 104 from the GPS receiver or alternatively from an OBD II interface to the vehicle. Following step 146, the processing of the GPS signal is complete.

Figure 6C:
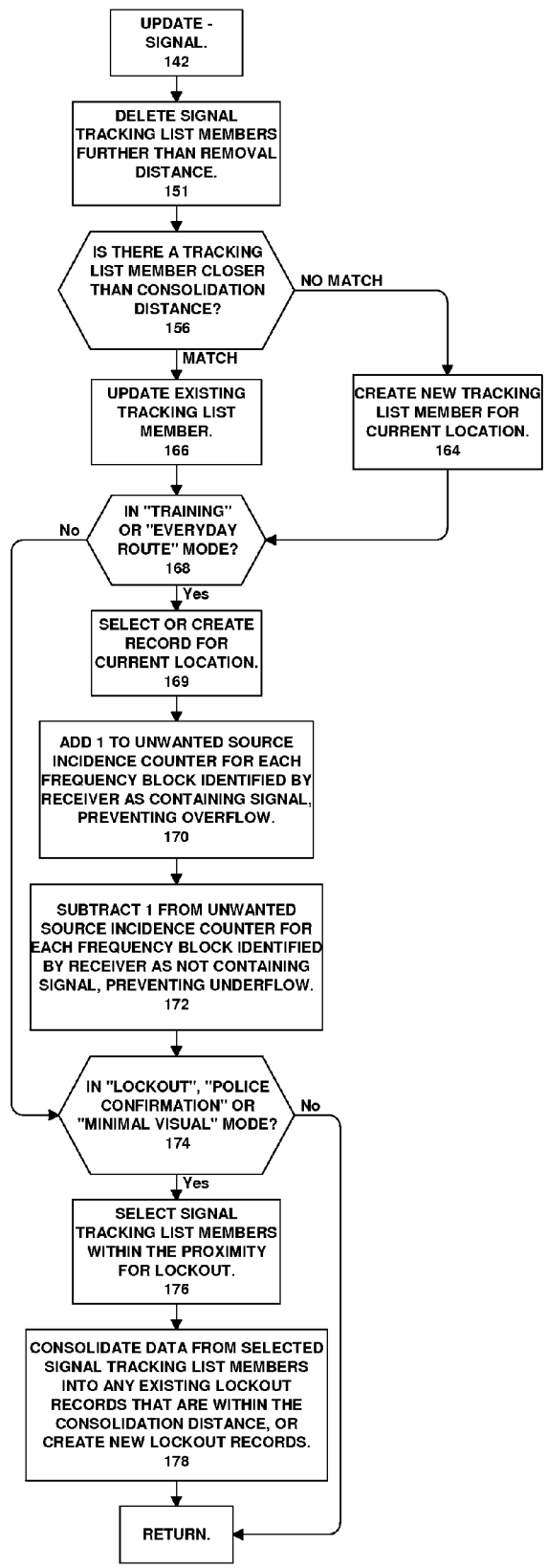
FIG. 6C is a flow chart of operations of the CPU of FIG. 2 in updating stored information when a radar signal is being received.

Referring to FIG. 6C, updating of the signal information in the presence of a police radar signal can be elaborated. In the first step 151, any signal tracking list members that are further than the Removal Distance For Tracked Signals are deleted. Next, different actions are taken based upon whether the signal tracking list already contains signal information for the detector's current coordinate. If there is no tracking list member for a coordinate within the Region Consolidation For Tracked Signals distance, then a new tracking list entry is created 164. If, however, there is already a tracking list member for a nearby location, that member is updated. Thereafter, in step 168 it is determined whether the GPS enabled radar detector is in its "training" or "everyday route" mode. As noted above, in these modes, where implemented, detailed signal information stored in the database is continuously updated each time a location is encountered. Accordingly, if the detector is in either its "training" or "everyday route" mode, then in step 170 the unwanted source incidence counter for each frequency block identified by the radar receiver 24 as containing signal, is incremented, preventing an overflow. Subsequently, in step 172 the unwanted source incidence counter for each frequency block identified by the radar receiver 24 as not having signal, is decremented, preventing an underflow. This thus updates the source incidence counters for each frequency block for the current location. After this processing, (or immediately after step 168 if the GPS enabled radar detector does not implement or is not using the "training" or "everyday route" mode,) the "lockout" and/or the additional "police confirmation" and "minimal visual" modes discussed above, are processed. Specifically, if in step 174, one of these modes is engaged, then in step 176 the signal tracking list members that are within the proximity for lockout are selected, and in step 178, the data from the selected tracking list members is stored in the signal database, along with, as appropriate, an indication of the specific mode involved. Step 178 involves updating any existing lockout records that are within the Lockout Region Consolidation distance, and creating new lockout records where there are no existing lockout records within the consolidation distance. At the conclusion of these operations, updating in step 142 is complete.

Figure 6D:
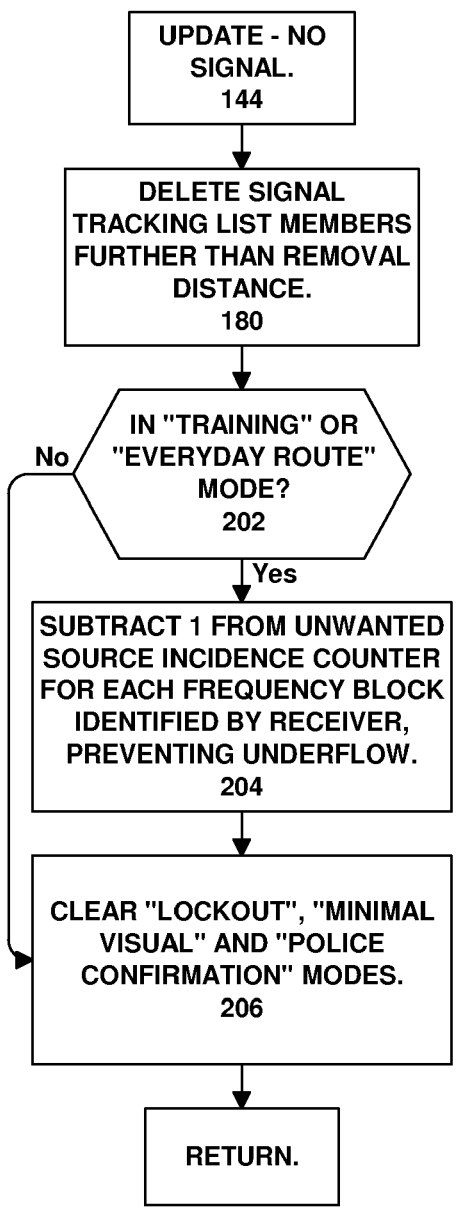
FIG. 6D is a flow chart of operations of the CPU of FIG. 2 in updating stored information when a radar signal is not being received.

Referring now to FIG. 6D, processing in step 144, to update various databases when no signal is detected, can be explained. As will be elaborated below, when no police radar signal is being received by the GPS enabled radar detector, this indicates that many of the modes described above for tracking and identifying sources of police radar signal should be terminated.

First, in step 180 any signal tracking list members that are further than the Removal Distance For Tracked Signals are deleted. If no signal is received over a period of time while the detector continues to move, this step will eventually purge the signal tracking list of all members, but only after the detector has moved beyond the removal distance from all locations where signals were received.

After the foregoing, if the detector is implementing "training" and/or "everyday route" modes, in step 202 it is determined whether the detector is in its "training" or "everyday route" mode. If so, then the detector should update the stored signal information for the current location as part of those modes. Specifically, to update signal information, in step 204 all of the unwanted source incidence counters for frequency blocks identified by the receiver are decremented, preventing underflow.

Following step 204, or immediately following step 200 if there is no matching signal information or step 202 if the detector is not in its "training" or "everyday route" mode, in step 206 any of the "frequency lockout", "location lockout", "minimal visual" and "police confirmation" modes that are implemented by the detector are cleared, because the tracking of a police radar signal has ended, and these modes are therefore no longer relevant to the current location of the vehicle.

Figure 6E:
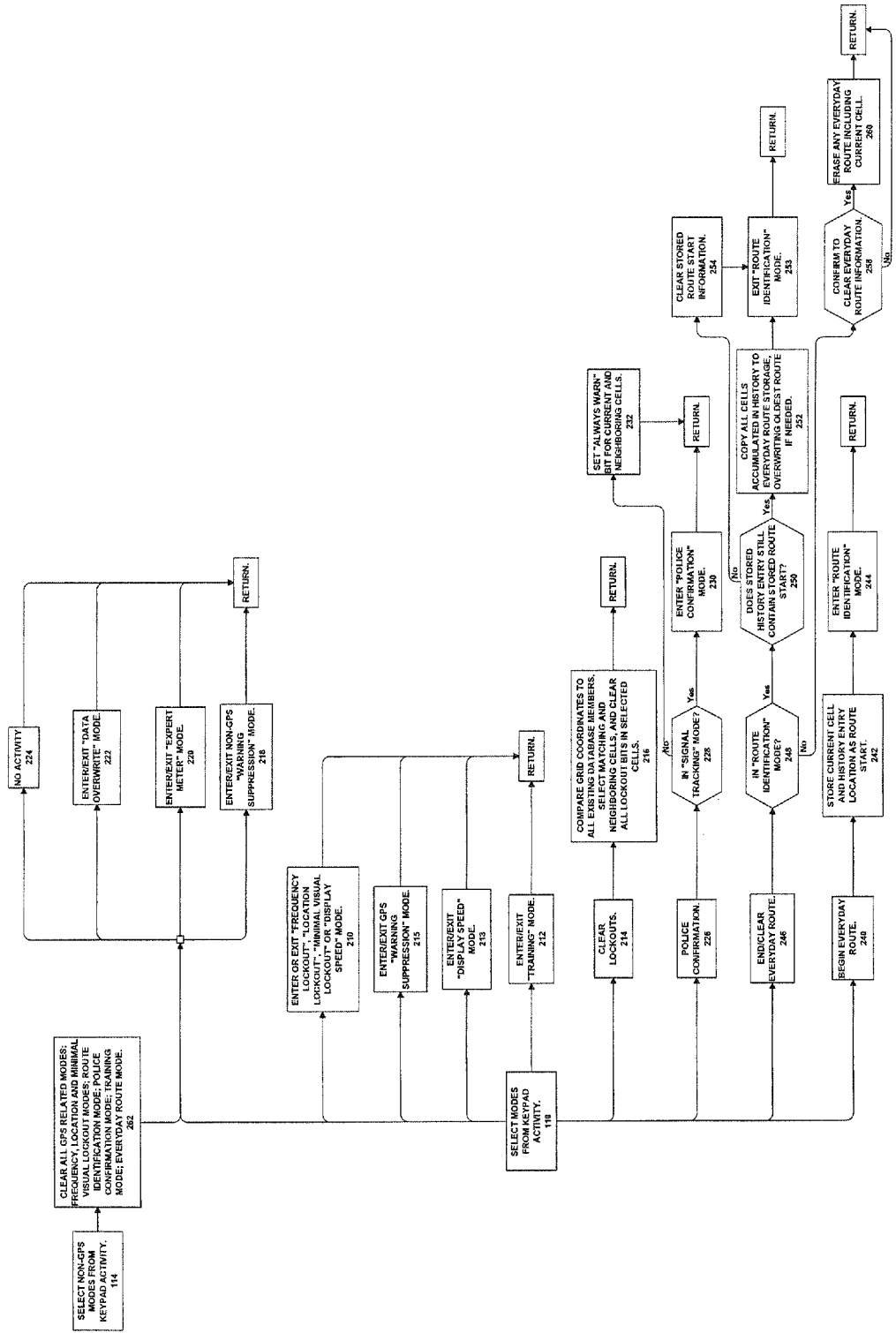
FIG. 6E is a flow chart of operations of the CPU of FIG. 2 in responding to keypad activity to change operative modes of the GPS enabled radar detector.

Referring now to FIG. 6E, the processing of keypad activity to enter and exit the various modes described throughout can be explained. As noted with reference to FIG. 6A, various modes are available only if a GPS signal has been obtained from the GPS receiver. If a GPS signal has been obtained then modes are selected from the keypad beginning at step 110. If a GPS signal has not been obtained then modes are selected from the keypad beginning at step 114, and a substantial number of modes are disabled and cannot be selected in this circumstance.

The keypad activity to select and deselect a mode may vary based upon the application and style of the GPS enabled radar detector. The display and keypad 38 and 36 may interact to produce a menu system for selecting particular modes and displaying associated information. Alternatively, individual keys of keypad 36 may be utilized to directly activate certain modes. Furthermore, display 38 may include icons or other indicators to identify currently activated modes.

A first collection of modes that may be activated via the keypad 36, are the "frequency lockout", "location lockout", and "minimal visual lockout" modes. Through interactions with the keypad in step 210, the user may initiate or terminate these modes. As described above, when initiated, these modes cause lockout records with tracked signal information to be stored into the signal database.

In step 212 the vehicle operator may enter or exit the "training mode", if such is implemented, which as described above causes the GPS enabled radar detector to collect signal information for all cells that the vehicle traverses.

A third activity that may be undertaken with the keypad, in step 214, is to request to clear all lockouts for the current vehicle location. This step may be taken where the GPS enabled radar detector has previously been programmed to lockout a frequency or location and subsequently the vehicle operator sights a police source at that location, and wishes to terminate the lockout at that location. When the vehicle operator requests to clear all existing lockouts, in step 216 the coordinates of the vehicle location are compared to all existing records in the signal database, and all matching and/or neighboring locations (as determined based upon the Unlock Removal Distance for Locked Regions) are selected and all lockout records regarding those locations are cleared.

The vehicle operator may also enter or exit a "warning suppression" mode in step 218, in which a warning for a currently tracked police radar signal is suppressed, i.e., so that the detector does not continue to issue warning signals for the same radar signal received. A warning suppression function has been implemented in prior radar detectors, but prior detectors would discontinue suppression of a warning when a signal had not been received for a predetermined time period, such as 4 seconds. In the case of an intermittently received non-police signal, this could lead to a user having to constantly re-suppress the warning. The present invention, in one aspect, contemplates adding a location component to warning suppression if a GPS signal is present. Only after the detector has moved an appropriate distance from the location where the user activated the "warning suppression" mode, will the detector exit "warning suppression" mode. It would also be useful if the location detection and time delay could be used in combination, to create an even more efficient "warning suppression" mode. In the event that a GPS signal is not present the "warning suppression" mode will be based on time only.

An operator may also enter or exit an "expert meter" mode in step 220, requesting that enhanced information on police radar signals received and/or GPS related lockout information or signal incidence information be displayed on display 38 of the detector. An operator may also enter a "data override" mode in step 222, thus requesting that signal information for new locations visited by the vehicle not found in the database be stored, even at the expense of overriding the oldest previously stored data of this kind. It is also possible, as shown in FIG. 6E, that there may be no keypad activity at the time that operation of the detector passes through step 110. In this circumstance, step 224, no further processing is performed.

A further action that a vehicle operator may take is to confirm of a police sighting in step 226. This step causes the detector to enter "police confirmation" mode, if such a mode is implemented, so that the detector will ensure that police radar signals at the identified stakeout location is handled with particular urgency. If at the time that the operator presses the police confirmation, no apparent police radar signal is currently being tracked, then processing will continue from step 228 to step 232 in which the "always warn" flag bit is set for the current and neighboring cells of the current location of the vehicle. This step ensures that in future times when a police radar signal is detected in these locations, a warning will be delivered to the vehicle operator regardless of other conditions applicable at the time. If a signal is being tracked at the time that the vehicle operator enters a police confirmation, then a slightly different activity is undertaken. Specifically, in this case processing continues from step 228 to step 230 in which the "police confirmation" mode is entered. As noted above with respect to FIG. 6D, once the receiver is in police confirmation mode, during signal tracking, locations along the tracked path of the vehicle when the police radar signal was detected, will be noted in the signal database.

A further activity that may be undertaken by a vehicle operator is to indicate that the vehicle is at the beginning of an everyday route, in step 240. This mode, if implemented, causes the GPS enabled radar detector to begin to collect information on the everyday route, for the purpose of ultimately storing a definition of an everyday route to be evaluated in connection with the processing described in connection with FIG. 6B, step 128. When the user indicates that the vehicle is at the beginning of an everyday route, in step 242 the current cell coordinate and the current entry in the vehicle history database of FIG. 4 are stored for later reference. Then in step 244 the detector enters a "route identification" mode, used later in establishing that a route has been identified and is being tracked. When the user wishes to complete an everyday route or wishes to clear everyday route processing for the current vehicle location, the user engages an end or clear operation in step 246. When this step is taken by the user, an initial determination is made in step 248 whether the detector is currently in its "route identification" mode. If so, then the user has identified the end of the everyday route that was previously identified in step 240. Thus, in step 250 it is determined whether the history entry identified and marked in step 242 continues to store the location of the route start that was stored in step 242. If so, then all of the cells accumulated in the vehicle history following the history entry identified in step 242, describe the route taken by the vehicle along the path selected by the user. In this case, all cells accumulated in the history database of FIG. 4 are copied to a special "everyday route" storage area so that all of these cells are available for analysis in connection with the processing of FIG. 6B, step 128. After storing the accumulated history entry cells, in step 252, processing is completed. After step 252, in step 253 the "route identification" mode is exited.

If in step 250, it is determined that the vehicle history database is no longer storing the start of the everyday route defined by the user, then the everyday route defined by the user was too lengthy to be processed by the GPS enabled radar detector. In such a situation, in step 254 the stored route start information is cleared and the "route identification" mode is exited.

If in step 248, the GPS enabled radar detector is not in "route identification" mode at the time that the vehicle operator requests the end of everyday route in step 246, then the vehicle operator may wish to delete any everyday route that includes or passes through the current cell. Thus, in step 258, a display is generated to the operator requesting confirmation that any everyday route including the current cell should be cleared. If a confirmation is received in step 258, then in step 260 all everyday routes including the current cell are erased from the everyday route storage of the GPS enabled radar detector. If the vehicle operator does not confirm erasure of everyday route information, then processing completes without erasing any everyday route information.

In step 114 of FIG. 6A, non GPS modes of the GPS enabled radar detector may be activated utilizing keypad activity. This step may be taken if no GPS signal is available at some point during operation of the GPS enabled radar detector. In such a circumstance, in step 262 all GPS related modes of the GPS enabled radar detector are cleared. These include the frequency, location and minimal visual lockout modes, the route identification mode, the police confirmation mode, the training mode and the everyday route mode (step 262). After clearing these modes, non GPS related modes of the GPS enabled radar detector can be initiated. These modes include the "warning suppression" mode (step 218), the "expert meter" (step 220), and the "data override" mode (step 222). Other modes that the operator may attempt to select will be ignored so long as no GPS signal is being received.

Figure 6F:
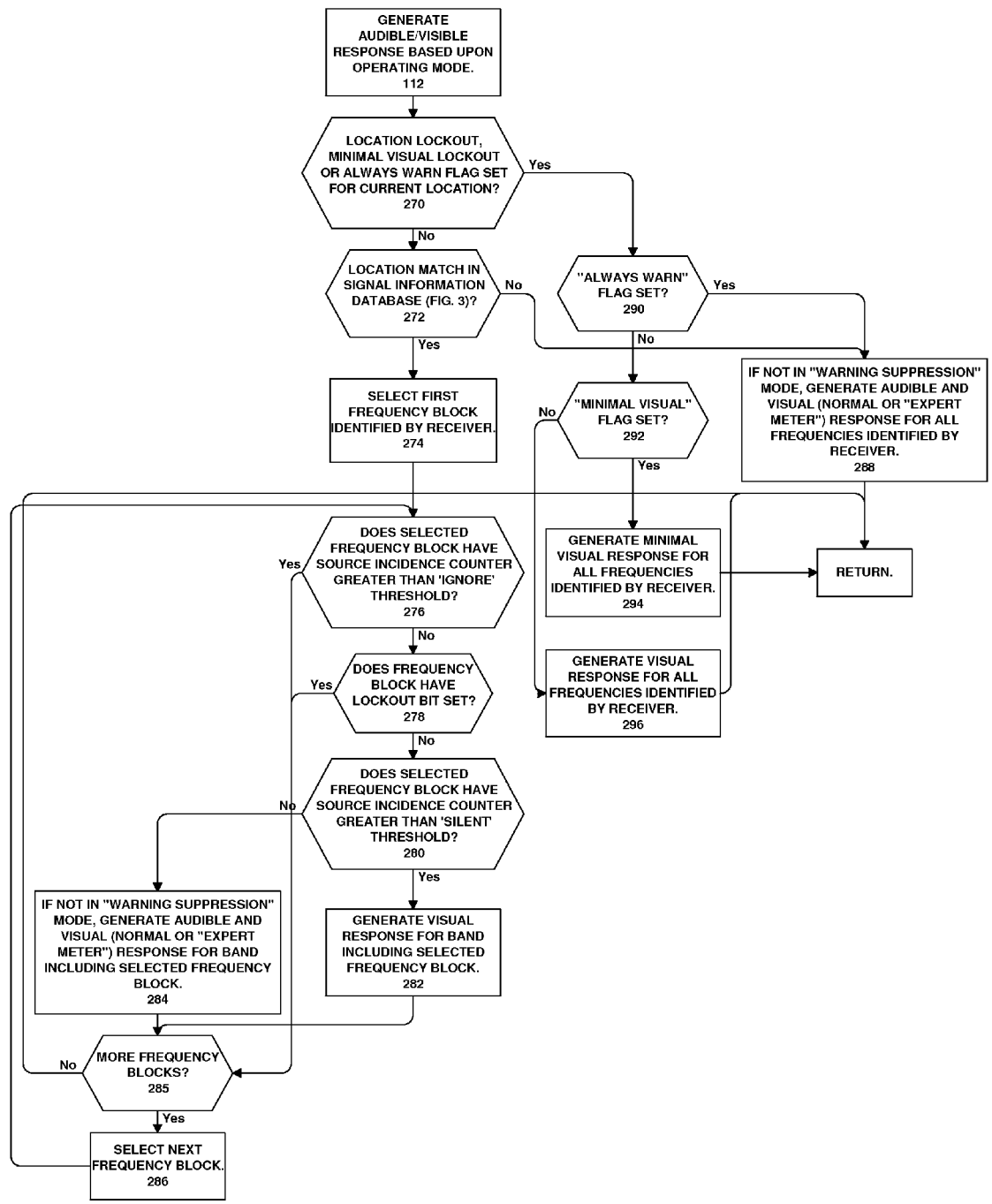
FIG. 6F is a flow chart of operations of the CPU of FIG. 2 in generating audible and visible responses based upon operating modes of the radar detector and the presence or absence of radar signals and stored information.

Referring now to FIG. 6F, operations performed in connection with generating audible and visible responses to police radar signals can be explained. In a first step 270, it is determined whether any of a number of lockout records or flags are applicable to the current location. In this step 270, for example, the flag database of FIG. 5 or the flags in records in the database shown in FIG. 6 may be evaluated to see if there is an entry for the current location, and if so (to the extent implemented) whether the location lockout, minimal visual lockout or always warn flags in that entry are set. In the absence of flags, or in embodiments where "minimal visual", "always warn" and "location lockout" flags are not implemented, processing of police radar signals at the current location proceeds based upon information in the signal information database, or based upon defaults if there is no previously stored information. Accordingly, if none of the flags identified in step 270 are set, then in step 272 it is determined whether there is a location match in the signal information database, based for example upon the Lockout Region Radius noted above. If there is such a match, the frequencies identified by the radar receiver are compared to the signal information in the entry in the database.

In the first step of this process, the first frequency block identified by the receiver is selected (step 274). Then, in step 276, for implementations where frequency blocks are associated with source incidence counters, it is determined whether the selected frequency block in the signal information database has a source incidence counter greater than a predetermined "ignore" threshold. If radar signals have been frequently detected in the selected frequency block, but there has never been a police sighting there, this is strongly indicative of a false source at that location. Accordingly, if the source incidence counter for a frequency block exceeds the "ignore" threshold, then any police radar signals identified in that frequency block are ignored. If, however, source incidence counters are not implemented, or the selected frequency block does not have a source incidence counter greater than this threshold, then in step 278 it is determined whether the frequency block has a lockout flag bit set. If the lockout flag bit is set, then the signal in the frequency block is ignored. Only if the frequency lockout bit for the selected frequency is not set, will processing continue to step 280. In step 280 it is determined whether the selected frequency block has a source incidence counter greater than a "silent"

threshold. If the source incidence counter exceeds this threshold, then it is likely that there is a false source radar signals at the location, and as a result in step 282 a visual-only response is generated for the frequency band including the selected frequency block. If, however, the selected frequency block does not have a source incidence counter greater than the silent threshold, or if source incidence counters are not implemented, then an audible and visual response can be generated. In step 284 it is determined whether the receiver is in "warning suppression" mode. If not in this mode, then an audible and visual response is generated for the band of signals including the selected frequency block. Visual response may be a normal response or may be an "expert meter" response depending upon the status of the "expert meter" mode of the receiver.

After steps 282 or 284, or immediately after steps 276 or 278 if a frequency block is to be ignored or has been locked out, in step 285 it is determined whether there are additional frequency blocks to be evaluated. If so, then in step 286 the next frequency block is selected and processing returns to step 276. After all frequency blocks have been evaluated, processing ends at step 285, and the generation of audible and visual responses is completed.

Returning to step 270, if one of the location lockout, minimal visual lockout or always warn flags are set for the current location, then in step 290 and in step 292 it is determined which of these flags is set. If the "always warn" flag is set for the current cell, then in step 288 an audible and visual response is generated for all frequencies identified by the received, unless suppressed by "warning suppression mode". Step 288 is also performed following step 272 if there is no match for the current location in the signal information database.

If the "minimal visual" flag is set for a current location, but the "always warn" flag is not, processing proceeds from step 290 to step 292 and then to step 294 in which a minimal visual response is generated for all frequencies identified by the receiver, such as a small blinking flag on the display of the detector.

If the "always warn" and "minimal visual" flags are not set, but the "location lockout" flag is set for the current location, then processing continues from step 270 through steps 290 and 292 to step 296, in which a visual-only response is generated for all frequencies identified by the receiver, which may include expert meter information or other details available from the detector.

After step 288, 294 or 296 processing to generate an audible and/or visual response is completed.

Figure 7B:
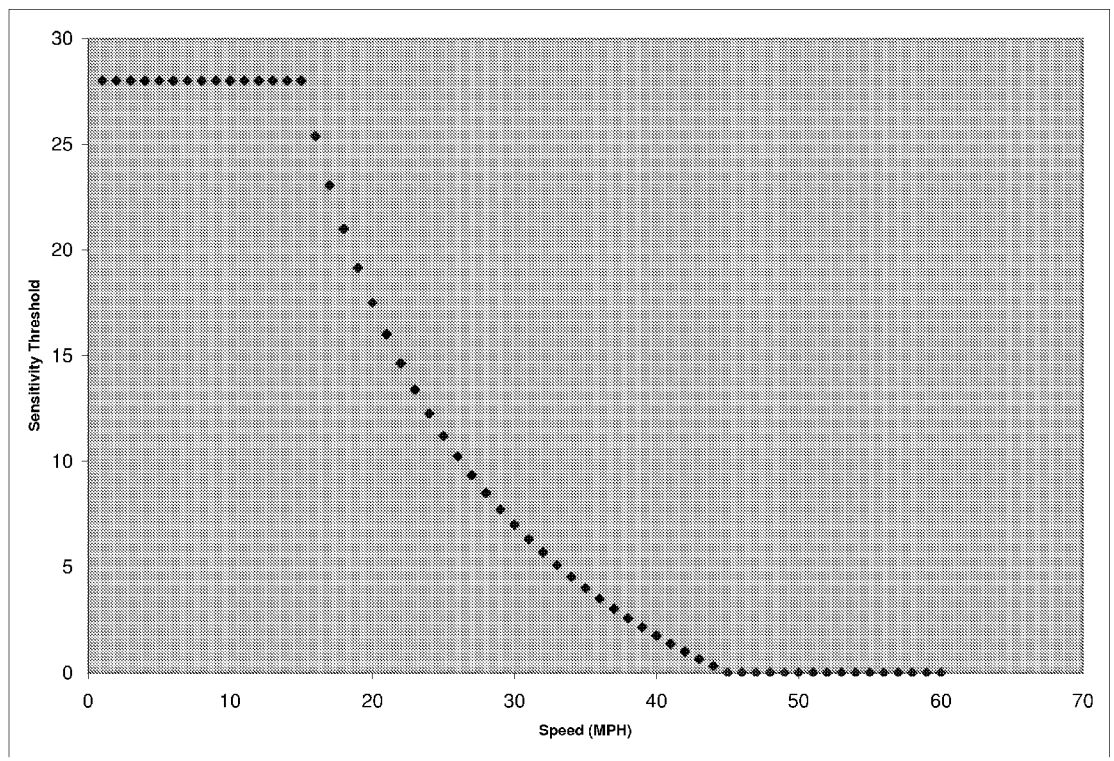
FIG. 7B illustrates the relationship between the threshold and the speed of the vehicle, as used in the Slow Speed Cancellation function.

In known radar detectors there are two threshold sensitivity modes, "highway" and "city". Further, known radar detectors have included a function for X & K Signal Filtering, which suppresses warnings for signals received simultaneously on both the X and K bands, as indicative of a non-police radar source. A radar detector in accordance with the present invention incorporates a sensitivity control (as part of keypad 36) with three settings: "Highway (HWY)", "Auto", and "City". FIG. 7A illustrates the functions that are active for a selected sensitivity mode. As illustrated in FIG. 7A, a Slow Speed Cancellation function is active in the "auto" and "highway" modes. An X&K filter function is active in the "auto" mode. Reduced gain for city driving is active for the "city" mode. The present invention thus combines user input and previously described speed-based input to establish threshold sensitivity in the "city" and "auto" modes. FIG. 7B illustrates the Slow Speed Cancellation function, and in particular the relationship between threshold and speed for the Slow Speed Cancellation function. The sensitivity is at its lowest, i.e. the warning threshold is at its highest, when the vehicle speed is below 15 mph. Above 45 mph the sensitivity is greatest and the threshold is set to zero. The X&K band filter, as noted above, cancels simultaneous X&K band signals as suggestive of a door opener or other non-police radar source. The city gain function reduces the gain to an appropriate level for city driving.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, it will be appreciated that principles of the present invention may also be applied to systems that do not include a GPS receiver. For example, in a simplified embodiment of the present invention, the radar warning receiver may automatically enter its "warning suppression" mode based upon the speed of the vehicle. The speed of the vehicle may, of course, be obtained from a GPS receiver, but if a GPS receiver is not available and/or unnecessarily expensive to include in the receiver, the receiver could obtain vehicle speed information directly from the vehicle's on-board information processing system via the OBD II interface discussed above. A threshold speed of 15 MPH could be used as a default, with "warning suppression" mode automatically engaged at speeds below this threshold. This threshold may be user-adjustable, e.g., within a range such as 5 to 50 MPH.

The interface connector used by the receiver may take other forms than the known USB standard. It may use any computer interface standard (e.g., IEEE 488), or an automotive wiring standard, the J1854, CAN, BH12 and LIN standards, or others.

In a more refined embodiment, a "everyday route" mode could be included, in which the operator can perform "everyday route velocity" training. In this "everyday route velocity" training mode, the vehicle speed at each point along the "everyday route" would be stored along with the cell locations along the route. Subsequently, when the detector determines that it is on a previously defined everyday route, it will enter "warning suppression" mode whenever the vehicle speed is within a tolerance of, or below, the velocity recorded when in "everyday route velocity" training mode. Thus, no warning signals will be generated so long as the vehicle is not traveling faster than the threshold speed identified by the operator during "everyday route velocity" training of the detector.

It will be further appreciated that the determination of whether to generate an audible or visual response, or both, may be based on information in addition to the flags applicable to the current cell of the vehicle. For example, the flags in cells recently traversed by the vehicle may also be consulted to determine whether audible or visual signals should be suppressed at a current cell. Thus, for example, if the detector passes through a cell that has been marked for "minimal visual" lockout, warnings will be suppressed for subsequent cells entered by the vehicle while the same signal is being tracked, regardless of whether flag bits in those cells call for a lockout.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A police activity detector comprising:
a receiver section receiving signals generated in the context of law enforcement activity, and
a warning section responding to the receiver section and providing a warning if a received signal correlates to a law enforcement signal;
the detector receiving signals indicative of vehicle motion from a position determining circuit,
the detector being responsive to a warning suppression mode to suppress said warning and continue suppression thereof until at least said signals indicative of vehicle motion indicate vehicle motion over a distance.

2. The police activity detector of claim 1 wherein the receiver section receives electromagnetic radar signals in a radar band.

3. The police activity detector of claim 1 wherein the receiver section receives signals carried in the visible or infrared spectrum.

4. The police activity detector of claim 1 further comprising an interface for reading vehicle motion signals from the position determining circuit on a host vehicle.

5. The police activity detector of claim 4 wherein the interface is an OBDII compliant interface.

6. The police activity detector of claim 4 wherein the interface is an IVBD compliant interface.

7. The police activity detector of claim 1 further comprising an interface reading the vehicle speed data from a position determining circuit in a host vehicle.

8. The police activity detector of claim 7 wherein the interface is an OBDII compliant interface.

9. The police activity detector of claim 7 wherein the interface is an IVBD compliant interface.

10. The police activity detector of claim 1 wherein the warning section is a visible display that makes visible warnings.

11. The police activity detector of claim 1 wherein the warning section is an audio speaker that makes audible warnings.

12. The police activity detector of claim 1 further comprising a position determining circuit generating said signals indicative of vehicle location and speed.

13. The police activity detector of claim 1 wherein the detector is further responsive to said warning suppression mode to suppress said warning and continue suppression thereof until a period of time elapses without receipt of a particular signal by said receiver section.

14. A police activity detector comprising:
a receiver section receiving signals generated in the context of law enforcement activity; and
a warning section responding to a signal received by the receiver section greater than a threshold strength, and providing a warning if a received signal correlates to a law enforcement signal,
the warning section determining the threshold strength in relation to vehicle speed data and input from a user of the detector.

15. The police activity detector of claim 14 wherein the receiver section receives electromagnetic radar signals in a radar band.

16. The police activity detector of claim 14 wherein the receiver section receives signals carried in the visible or infrared spectrum.

17. The police activity detector of claim 14 further comprising an interface reading vehicle speed data from a host vehicle.

18. The police activity detector of claim 17 wherein the interface is an OBDII compliant interface.

19. The police activity detector of claim 17 wherein the interface is an IVBD compliant interface.

20. The police activity detector of claim 14 further comprising an interface reading the vehicle speed data from a position determining circuit in a host vehicle.

21. The police activity detector of claim 20 wherein the interface is an OBDII compliant interface.

22. The police activity detector of claim 20 wherein the interface is an IVBD compliant interface.

23. The police activity detector of claim 14 wherein the warning section is a visible display that makes visible warnings.

24. The police activity detector of claim 14 wherein the warning section is an audio speaker that makes audible warnings.

25. The police activity detector of claim 14 further comprising a position determining circuit, the warning section utilizing said position determining circuit to identify vehicle speed.

26. The police activity detector of claim 14 wherein said input from a user is the selection of a desired sensitivity by the user.

27. The police activity detector of claim 26 wherein said input from a user comprises one or more of: selection of a city sensitivity, selection of a highway sensitivity, and selection of a automatic sensitivity.

28. A police activity detector comprising:
a receiver section adapted to receive electromagnetic signals indicative of police activity;
an alert section responsive to the receiver section and adapted to provide an alert if a received electromagnetic signal correlates to a police signal;
a display for displaying information to a user;
a speed determining circuit generating a vehicle speed signal;
wherein information presented on said display includes information relating to vehicle speed, and
wherein the speed determining circuit determines vehicle speed from movement identified by a position determining circuit.

29. The police activity detector of claim 28, wherein said electromagnetic signals include radar signals in a radar band.

30. The police activity detector of claim 28, wherein said electromagnetic signals are carried in the visible or infrared spectrum.

31. The police activity detector of claim 28 wherein said vehicle speed information is presented on said display in conjunction with the provision of an alert by the alert section.

32. The police activity detector of claim 28 wherein said vehicle speed information is presented on said display in response to user input.

33. The police activity detector of claim 28 wherein said receiver incorporates said position determining circuit.

34. The police activity detector of claim 28 further comprising an external interface, wherein movement information is obtained from a position determining circuit via said external interface.

35. The police activity detector of claim 34 wherein the interface is an OBDII compliant interface.

36. The police activity detector of claim 34 wherein the interface is an IVBD compliant interface.

37. The police activity detector of claim 28, further comprising an external interface, wherein the speed determining circuit determines vehicle speed from information received via said external interface.

38. The police activity detector of claim 37 wherein the interface is an OBDII compliant interface.

39. The police activity detector of claim 37 wherein the interface is an IVBD compliant interface.

40. A police activity detector comprising:
- a receiver section adapted to receive electromagnetic signals indicative of police activity;
- an alert section responsive to the receiver section and adapted to provide an alert if a received electromagnetic signal correlates to a police signal;
- a digital interface connector compliant with the mini-B USB standard;
- wherein said police activity detector is configurable in response to digital signals received via said digital interface connector.

41. The police activity detector of claim 40, wherein said electromagnetic signals include radar signals in a radar band.

42. The police activity detector of claim 40, wherein said electromagnetic signals are carried in the visible or infrared spectrum.

43. The police activity detector of claim 40 wherein said interface connector is connectable to a digital computer for configuration of said detector.

* * * * *

UNITED STATES PATENT AND TRADEMARK OFFICE
CERTIFICATE OF CORRECTION

| | | |
|---|---|---|
| PATENT NO. | : 7,576,679 B1 | Page 1 of 2 |
| APPLICATION NO. | : 11/620443 | |
| DATED | : August 18, 2009 | |
| INVENTOR(S) | : Steven K. Orr et al. | |

It is certified that error appears in the above-identified patent and that said Letters Patent is hereby corrected as shown below:

Column 1, line 43, change "band" to --bands--.

Column 1, line 48, change "DSP=s" to --DSP's--.

Column 1, line 50, change "DSP=s" to --DSP's--.

Column 2, line 26, change "was" to --were--.

Column 2, line 28, change ">polluters=" to --'polluters'--.

Column 2, line 33, change "product=s" to --product's--.

Column 4, line 27, change "maintain" to --maintains--.

Column 4, line 42, change "DRAWING" to --DRAWINGS--.

Column 4, line 57, change "a illustration" to --an illustration--.

Column 6, line 29, change "receiver=s" to --receiver's--.

Column 7, line 62, change "navigation system" to --navigation system.--.

Column 10, line 32, change "rapidly compares" to --rapidly compare--.

Column 10, line 53, change "detector=s" to --detector's--.

Column 12, line 58, change "show" to --shows--.

Column 13, line 41, change "were" to --was--.

Signed and Sealed this

Twenty-ninth Day of June, 2010

David J. Kappos
*Director of the United States Patent and Trademark Office*

CERTIFICATE OF CORRECTION (continued)
U.S. Pat. No. 7,576,679 B1

Column 13, line 52, change "a give area" to --a given area--.

Column 14, line 63, before as; add --is--.

Column 15, line 25, change "records" to --record--.

Column 15, line 37, delete "a"; after is.

Column 16, line 30, change "at" to --in--.

Column 16, line 49, delete "it"; after upon.

Column 17, line 44, add --are--; before selected.

Column 19, line 26, change "routes are traversed." to --routes is traversed.--.

Column 19, line 28, add --of--; after beginning.

Column 20, line 33, change "steps 132" to --step 132--.

Column 23, line 2, delete "of"; after confirm.

Column 23, line 5, change "is" to --are--.

Column 24, line 9, change "non GPS" to --nonGPS--.

Column 24, line 18, change "non GPS" to --nonGPS--.

Column 25, line 2, change "signals" to --signal--.

Column 25, line 29, change "received" to --receiver--.

Column 26, line 66, change "applicant's" to --applicants'--.